(12) United States Patent
Deliwala

(10) Patent No.: US 8,462,834 B2
(45) Date of Patent: Jun. 11, 2013

(54) METHODS AND APPARATUS FOR GENERATING AND PROCESSING TRANSMITTER SIGNALS

(75) Inventor: Shrenik Deliwala, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 1246 days.

(21) Appl. No.: 12/269,615

(22) Filed: Nov. 12, 2008

(65) Prior Publication Data

US 2009/0129487 A1  May 21, 2009

Related U.S. Application Data

(60) Provisional application No. 61/002,546, filed on Nov. 12, 2007.

(51) Int. Cl.
*H04B 1/38* (2006.01)

(52) U.S. Cl.
USPC .......................................................... 375/219

(58) Field of Classification Search
USPC .................. 375/219; 342/22, 145; 356/4.01, 356/5.01
See application file for complete search history.

(56) References Cited

U.S. PATENT DOCUMENTS

| 5,000,568 A | 3/1991 | Trutna, Jr. et al. |
| 5,029,184 A | 7/1991 | Andren et al. |
| 5,329,467 A | 7/1994 | Nagamune et al. |
| 5,347,357 A | 9/1994 | Nourrcier, Jr. |
| 6,753,950 B2 * | 6/2004 | Morcom ..................... 356/4.01 |
| 6,952,441 B2 | 10/2005 | Peeters |
| 7,236,247 B2 | 6/2007 | Ozcan et al. |
| 7,639,597 B2 * | 12/2009 | Shattil ........................... 370/203 |
| 2005/0220172 A1 | 10/2005 | Mo et al. |
| 2007/0018884 A1 | 1/2007 | Adams et al. |
| 2007/0109957 A1 * | 5/2007 | Hirooka et al. ............... 370/210 |
| 2007/0132630 A1 * | 6/2007 | Beckner ........................ 342/22 |
| 2008/0107429 A1 | 5/2008 | Galli et al. |
| 2009/0022050 A1 | 1/2009 | Ohta |
| 2009/0135714 A1 | 5/2009 | Deliwala |

FOREIGN PATENT DOCUMENTS

GB  1 585 054  2/1981

OTHER PUBLICATIONS

International Search Report and Written Opinion mailed Mar. 3, 2009 for International Application No. PCT/US2008/012693 (11 pages).

* cited by examiner

*Primary Examiner* — Jaison Joseph
(74) *Attorney, Agent, or Firm* — Knobbe Martens Olson & Bear LLP

(57) ABSTRACT

Transmitter signals are modulated with one or more codes which may represent a pulse even though the code(s) are not shaped as pulses. The code(s) may be generated by defining a pulse by its Fourier components, and then adding random phases to the Fourier components. A time-domain signal may then be created, which may serve as the code to be modulated on a carrier wave. Upon reflection of the transmitter signal, the received signal may be processed by a receiver to recover the pulse. The time-of-flight of the transmitter signal can then be determined, enabling distance measurements to be made.

39 Claims, 15 Drawing Sheets

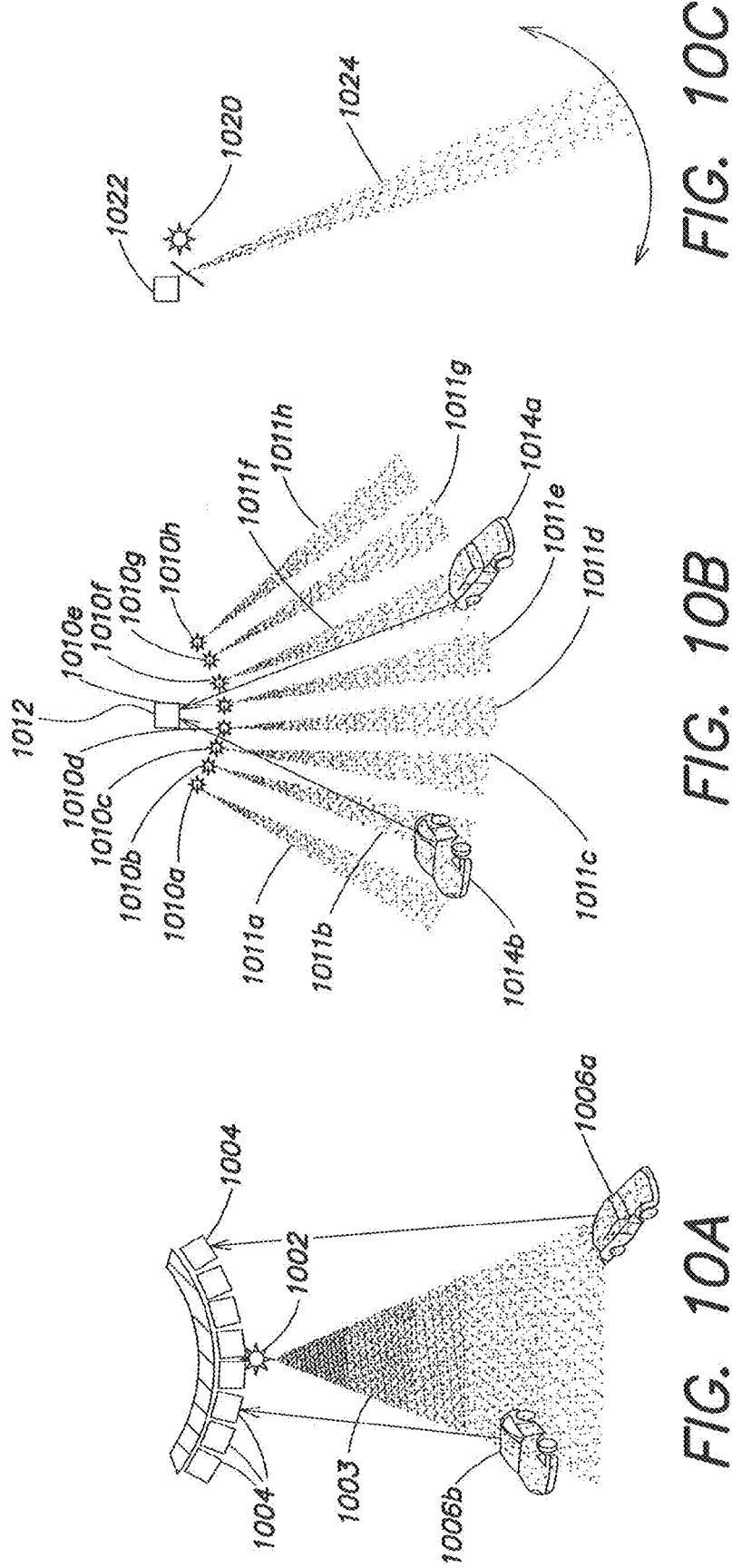

METHODS AND APPARATUS FOR GENERATING AND PROCESSING TRANSMITTER SIGNALS

CROSS-REFERENCE TO RELATED APPLICATIONS

This Application claims the benefit under 35 U.S.C. §119 (e) of U.S. provisional patent application Ser. No. 61/002,546 (the '546 application), entitled "LIDAR System," and filed on Nov. 12, 2007. The '546 application is incorporated herein by reference in its entirety.

BACKGROUND

1. Field

The technology described herein relates to apparatus and methods for generating and processing coded transmission signals, and various applications of such apparatus and methods.

2. Discussion of Related Art

Distance measurements to an object can be made by sending and receiving transmission signals. A transmitted signal is sent from a transmitter toward the object. The transmitted signal is reflected by the object and detected by a receiver positioned at the same location as the transmitter. Assuming some knowledge about the speed of propagation of the transmitted and reflected signals, the distance to the object can be calculated by determining the amount of time between when the signal is transmitted by the transmitter and when it is received by the receiver.

BRIEF SUMMARY

According to one aspect, a method of producing a coded continuous wave transmitter signal is provided. The method comprises producing a continuous wave carrier signal, and modulating the continuous wave carrier signal with a code to produce the coded continuous wave transmitter signal, the code representing a pulse in non-pulse form.

According to another aspect, a method comprises transmitting a continuous wave transmitter signal comprising a continuous wave carrier signal modulated with a code representing a pulse in non-pulse form. The method further comprises receiving the continuous wave transmitter signal, and processing the continuous wave transmitter signal to recover the pulse.

According to another aspect, a transmitting system comprises a computing engine configured to generate a code, the code representing a pulse in non-pulse form, and a signal generator configured to produce a signal modulated by the code.

According to another aspect, a system comprises a transmitter configured to transmit a transmitter signal comprising a continuous wave carrier signal modulated with a code representing a pulse in non-pulse form. The system further comprises a receiver configured to receive the transmitter signal and process the transmitter signal to recover the pulse.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 10A illustrates a system including a single transmitter and multiple receivers, according to one embodiment;

FIG. 10B illustrates a system including multiple transmitters and a single receiver, according to another embodiment;

FIG. 10C illustrates a system including a single transmitter capable of scanning a field of view, and a single receiver, according to one embodiment;

DETAILED DESCRIPTION

Figure 1:
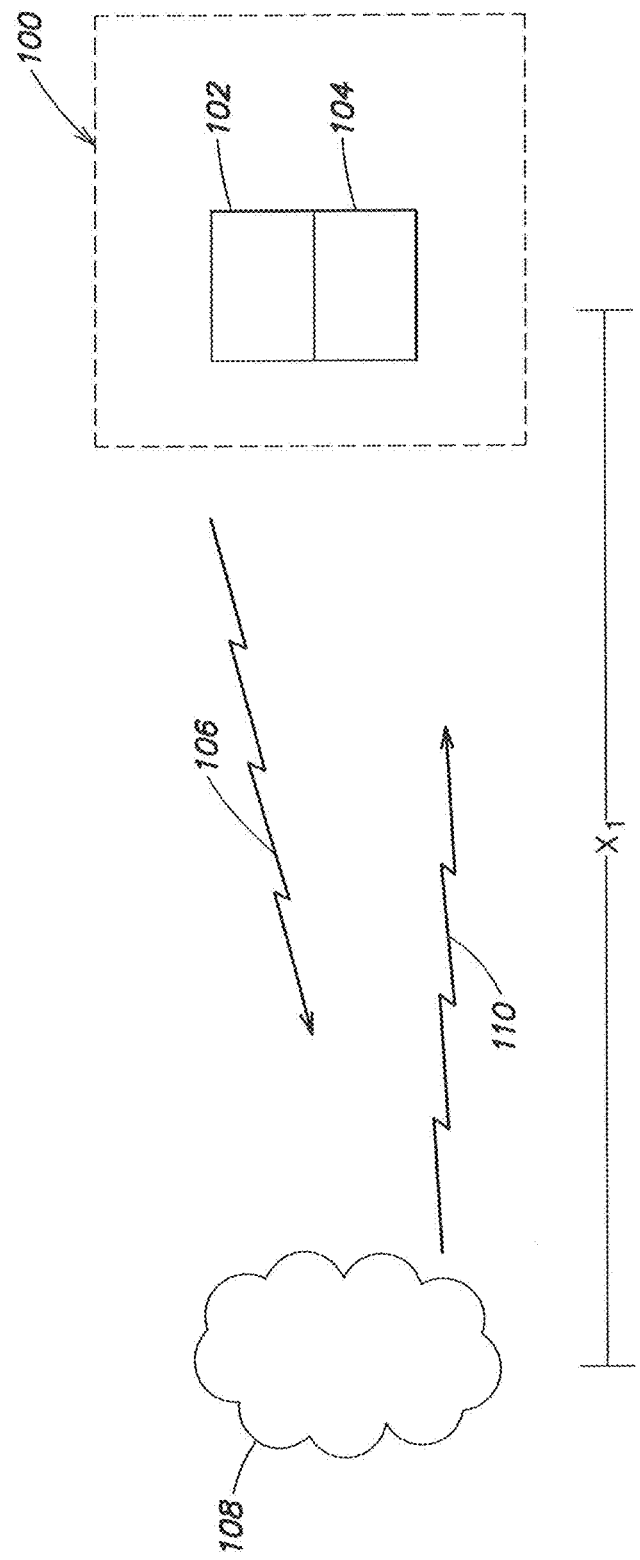
FIG. 1 is a system which can determine the distance to an object, according to one embodiment.

Apparatus and methods are presented which may be used to effectively operate a continuous wave transmission system as a pulsed system, with little or no alteration of the continuous wave nature of the transmission signals. Transmitter signals may be coded with a code, or sequence, which includes the information of a pulse in a non-pulse form, such as a noise form. Thus, coding a continuous wave carrier signal with the code may do little, or nothing, to alter the continuous wave nature of the transmitter signal, while carrying the information of the pulse. Thus, benefits of continuous wave transmission systems, such as lower cost, design simplicity, and more easily achieved power requirements (e.g., lower peak power to average power ratios), may be realized, as well as benefits of pulsed-transmission modalities, such as high accuracy, and the ability to detect multiple reflections, to name a few. Such apparatus and methods may find use in range-finding systems (i.e., distance measuring systems) or other contexts. The methods and systems may be implemented as spread spectrum or ultra wideband technologies, among others.

According to an aspect of the invention, a continuous wave (CW) carrier signal is encoded with a code representing a pulse, in non-pulse form. Any type of pulse may be used, as the various aspects of the invention are not limited to use with any particular type of pulse. Examples of suitable pulses may include an impulse, a square pulse, or a triangle pulse, among others. An example of a non-pulse form into which the pulse may be transformed to form the code is a Gaussian noise-like sequence. However, the various aspects and embodiments of the invention are not limited to use with any particular non-pulse forms, as there are many non-pulse forms into which a pulse may be transformed. Furthermore, the type of non-pulse form used may be chosen to have beneficial characteristics. For example, as compared to a pulse, the code may have a low peak-to-average power ratio. Also, the transformation of the pulse into a non-pulse form may be completed using any suitable type of transformation, examples of which may include a Fourier transform, a Laplace transform, or a Hadamard transform, among others. The transformation may comprise scrambling values of the pulse, modifying the pulse with a key formed of a set of numbers, or any other suitable steps.

The coded signal, comprising the continuous wave carrier signal modulated with the code, may then be transmitted by a transmitter and received by a receiver. The receiver may then perform a reverse transformation on the received signal to recover the pulse, i.e., to undo the transformation of the pulse into a non-pulse form. In this manner, a transmitter-receiver system may effectively operate as if transmitting and receiving a pulse, while in actuality the signals transmitted and received do not resemble pulses. It should be appreciated that, according to some embodiments, the receiver may have knowledge of the type of transformation used by a transmitter when transforming a pulse into a non-pulse form to form a code, so that the receiver may accurately undo the transformation when receiving the transmitted signal. Such knowledge may be provided in some embodiments by sending information between the receiver and transmitter, by using shared components for a receiver and transmitter, or by any other suitable manner.

Figure 12:
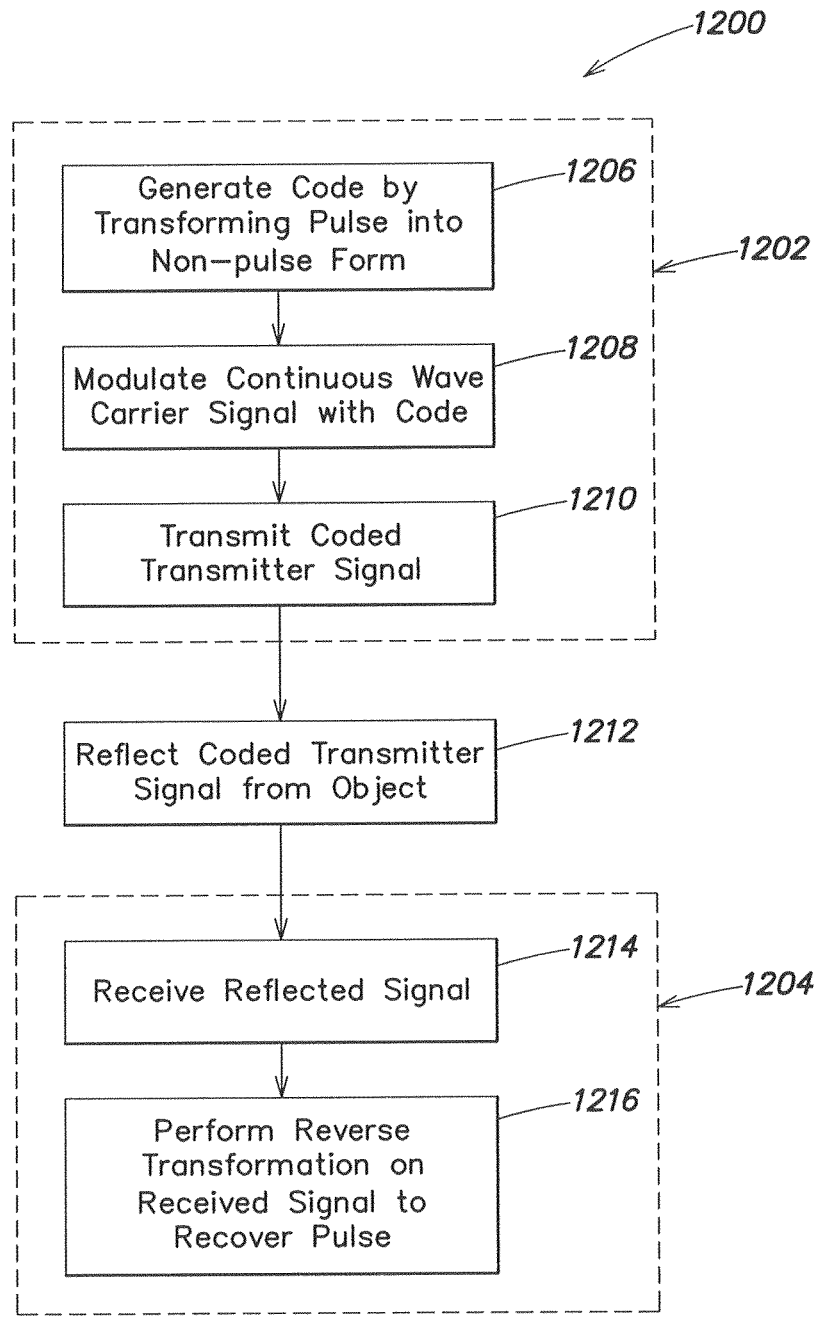
FIG. 12 is a flowchart illustrating a method of generating and processing coded continuous wave signals, according to one embodiment.

FIG. 12 illustrates one example of a method for transmitting and processing signals, according to one embodiment. As shown, the method 1200 may include a transmitting process 1202, and a receiving process 1204. The transmitting process 1202 may begin at 1206 with generating a code, or sequence, by transforming a pulse into a non-pulse form. For example, according to one embodiment, the pulse, which may be any type of pulse (e.g., an impulse, a square pulse, a triangle pulse, or any other type of pulse) may be a time domain signal, which may be transformed into a different domain. Once transformed into the other domain, the pulse may be modified, for example by randomizing, scrambling, or otherwise altering values of the pulse. The modified pulse may then be further modified to return it to a time domain signal, thus completing act 1206. The modification may result in the pulse no longer resembling a pulse in form, but rather resembling noise, or some other non-pulse form which may have beneficial characteristics in terms of use as a transmission and reception signal. It should be appreciated that act 1206 may be performed in various manners, and that not all manners of performing act 1206 may involve moving between different signal domains (e.g., between time domain and frequency domain).

Subsequently, the code, which again may carry the information of a pulse, but in non-pulse form, may then be used to modulate a continuous wave carrier signal at 1208. At 1210, the transmitter signal, comprising the continuous waver carrier signal coded with the code, may then be transmitted. According to the embodiment of FIG. 12, the transmitted signal may be reflected from an object, although it should be appreciated that such reflection need not occur in all embodiments. Then, at 1214, the reflected signal may be received by a receiver.

At 1216, the received signal may be processed to recover the pulse by transforming the code of the received signal into the pulse. In some embodiments, the transformation of the code into the pulse may comprise performing the reverse transformation of the transformation used in act 1206 to form the code from the pulse. It should be appreciated that, according to some embodiments, the steps taken to transform the code from the received signal into the pulse may not be an exact reverse of the transformation used to transform the pulse into the code at 1206. Rather, as used herein, a reverse transformation may include a transformation which undoes the effects of a different transformation, regardless of whether the reverse transformation actually entails performing the same steps of the different transformation in a reverse order.

According to one aspect of the invention, a continuous wave carrier signal may be modulated with a code, or sequence, representing a randomized version of a pulse, and then transmitted. The transmitted signal may be reflected from an object and received by a receiver positioned near the transmitter. The received signal may be processed to recover the pulse, from which the time-of-flight of the pulse may be determined. The distance from the transmitter and receiver to the object may then be determined using the time-of-flight of the pulse and the speed of propagation of the pulse.

FIG. 1 illustrates one example of a system according to one embodiment, which may utilize one or more of the methods described above. As shown, the system 100 comprises a transmitter 102 and a receiver 104. The transmitter 102 and receiver 104 may be positioned in substantially a same location so that they each are located substantially the same distance from any surrounding objects. The transmitter 102 and receiver 104 may be distinct, may be the same (i.e., a transceiver that operates as both a transmitter and a receiver), may share some components while having some distinct components, or may take any suitable form, as the various aspects of the invention are not limited in this respect.

The transmitter 102 may generate and transmit a transmitter signal 106, which may be a coded continuous wave transmitter signal, as described further below. The transmitter signal 106 may impact, and be at least partially reflected from, an object 108, thus generating a reflected signal 110, i.e., a reflected version of the transmitter signal 106. The object 108 may be a car, a tree, a person, or any other type of object, as the various aspects of the invention are not limited to use with any particular type of object. Also, the object 108 may be stationary or moving. The reflected signal 110 may be received by the receiver 104, from which the distance $x_1$ between the receiver and transmitter and the object 108 may be determined using Eq. (1):

$$x_1 = (vt/2) \qquad \text{Eq. (1)}$$

where v is the velocity of the transmitter signal 106 and the reflected signal 110, which is presumed to be the same for both, and t is the time between when the transmitter signal 106 is transmitted by transmitter 102 and the time when the reflected signal 110 is received by receiver 104.

Figure 2:
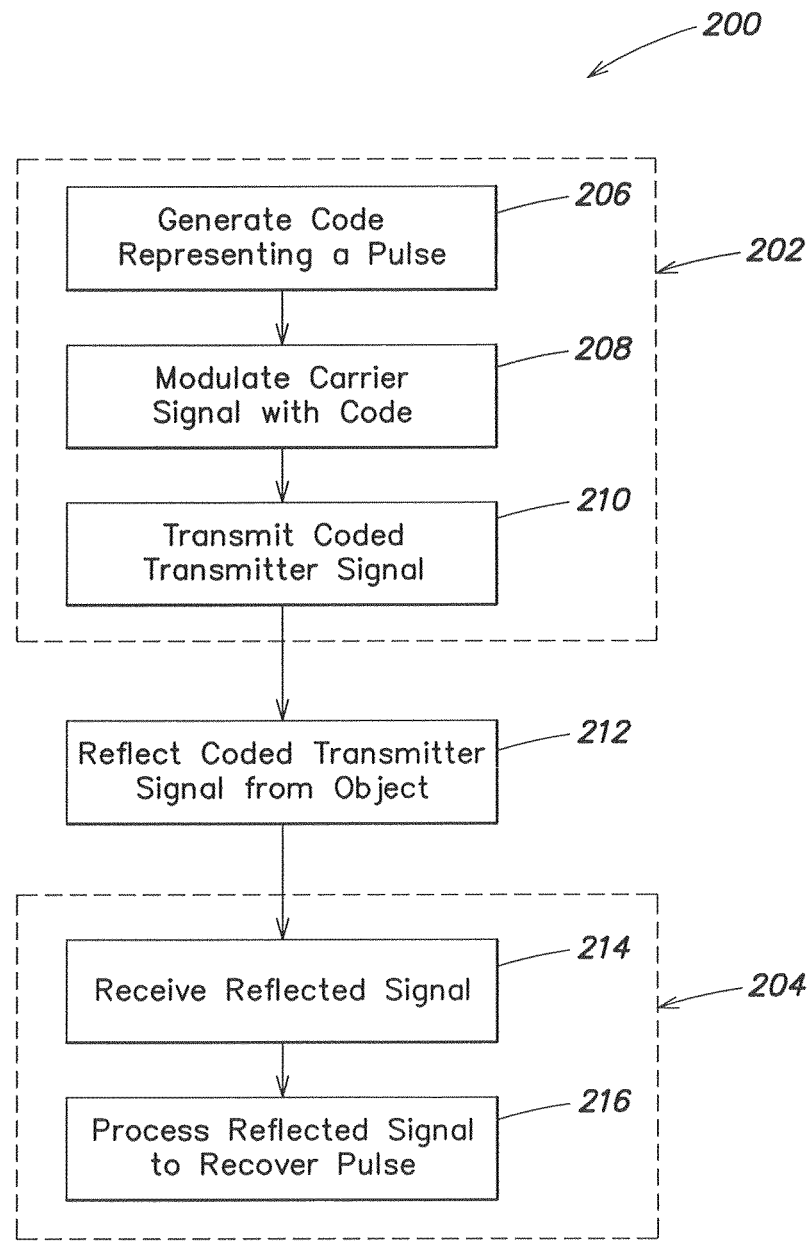
FIG. 2 is a flowchart of a method of generating and processing a transmission signal, according to one embodiment.

According to an aspect of the invention, the transmitter signal 106, and therefore the reflected signal 110, may be coded continuous wave signals. The code may represent a pulse in non-pulse form, for example being a randomized version of a pulse. For example, as will be discussed in greater detail below, a pulse (e.g., a delta function, a square pulse, a triangle pulse or any other type of pulse) may be transformed mathematically into a randomized signal, for example a signal that appears to be noise. This "noise" signal may serve as the code to be modulated on a continuous wave carrier signal to produce the coded continuous wave signal 106. Then, as mentioned previously, the reflected signal 110, which may therefore also contain the code modulated on a continuous wave carrier signal, may be processed to recover the pulse. FIG. 2 illustrates one example of a method for generating and processing a coded continuous wave signal, such as the transmitter signal 106 and reflected signal 110.

The method 200 comprises several acts which may be performed as part of a transmitting process 202 and several acts which may be performed as part of a receiving process 204. Method 200 is not limited in the type of hardware and/or software which may be used to perform the various acts enumerated, but rather may be performed in any suitable manner. For example, the acts of the transmitting process 202 may be performed by the same hardware and/or software as the acts of the receiving process 204, by different hardware and/or software, or by any suitable combination of shared hardware and/or software, as the methodology is not limited in this respect.

Figure 3:
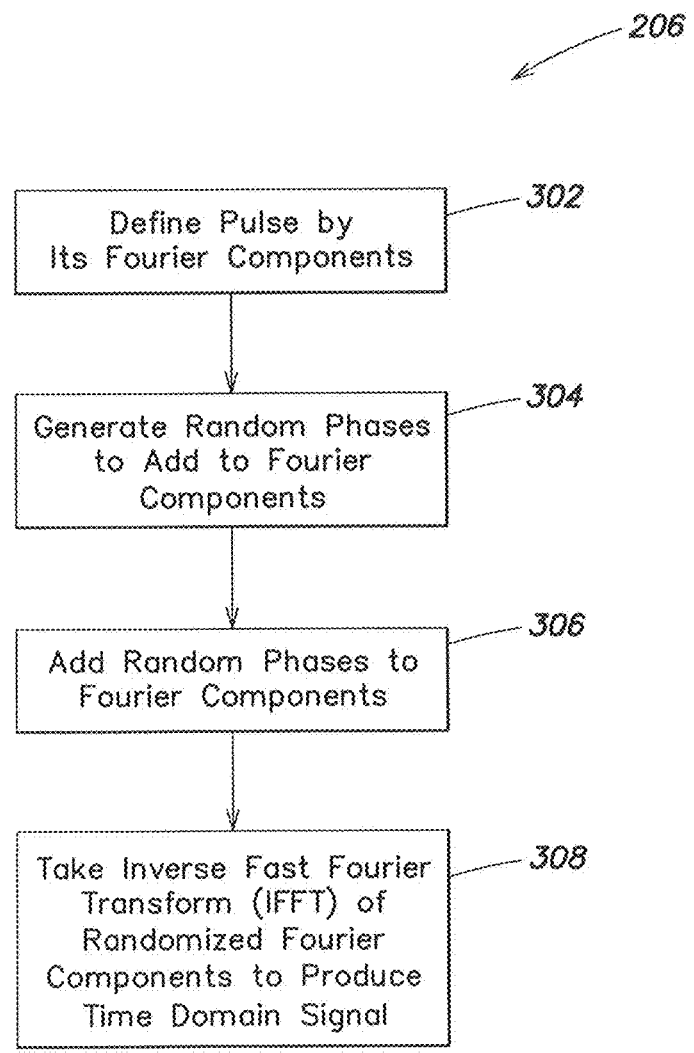
FIG. 3 is a flowchart of a method of generating a code representing a pulse, as used in the method of FIG. 2, according to one embodiment.

As shown, the method 200 begins with the transmitting process 202, and namely with generating a code representing a pulse at 206. Generating the code may comprise generating a randomized version of a pulse, as will be described in further detail below with respect to FIG. 3. It should be appreciated that while the methodology of FIGS. 2-3 shows and describes generating a code, other embodiments do not involve actual generation of the code. Rather, according to some embodiments, the code may be read out from a memory containing one or more suitable codes, a library, or provided in any other suitable manner.

Once the code is generated, a carrier signal may be modulated with the code at 208. The carrier signal may be a continuous wave carrier signal, for example produced by a continuous wave transmitter. The code may be limited in time, having any suitable duration. For example, in some embodiments the duration of the code may be chosen to be longer, and sometimes significantly longer, than the maximum expected time of flight for the code, from the time the code is transmitted by a transmitter to the time the code is received by a receiver. For example, the duration of the code may be 2 nanoseconds, 2 microseconds, 4 microseconds, 10 microseconds, 200 microseconds, a few milliseconds, or any other suitable duration, as the various aspects described herein are not limited to using codes of any particular duration.

The continuous wave carrier signal may be modulated with a single occurrence of the code, or may be modulated with multiple occurrences of the code. If the continuous wave carrier signal is modulated with multiple occurrences of the code, the multiple occurrences may be separated in time, for example by modulating the continuous wave carrier signal with two 1-second long occurrences of the code separated by five seconds, or may be continuously repeating such that there is no time gap between the occurrences of the code on the carrier signal.

The coded transmitter signal, i.e., the continuous wave carrier signal modulated with one or more occurrences of the code generated at 206, may then be transmitted at 210, for example by transmitter 102 in FIG. 1, or by any other suitable transmitter. As will be described in further detail below, the code may not alter, or may not significantly alter, the continuous nature of the carrier signal, such that the transmitter signal may be produced by a continuous wave transmitter. For example, the code may include randomized sample points of a pulse, and may approximate noise in some embodiments. Thus, the ratio of peak power to average power of the code may not be large, for example being less than 10, or even lower in some embodiments.

After being transmitted, the transmitter signal may be reflected from an object at 212. It should be appreciated that according to some embodiments, the transmitted signal may undergo multiple reflections, i.e., be reflected from multiple objects, thus generating multiple reflected signals. The method 200 may apply equally well to scenarios involving multiple reflections.

The method 200 may then progress to the receiving process 204. In particular, the reflected signal(s) generated at 212 may be received at 214 by any suitable receiver. The received signal(s) may then be processed, as described in further detail below with respect to FIG. 5, to recover the pulse represented by the code produced at 206. The processing may be performed by the receiver, or may be sent by the receiver to any suitable processing device, such as a computer, an application specific integrated circuit (ASIC), or any other suitable hardware, software, or combination thereof, for processing the received signal(s). As mentioned previously, the recovered code and/or pulse may be used to determine the time-of-flight of the pulse represented by the code, from which a determination of the distance to the reflecting object can be made. However, the methodology illustrated in FIG. 2 is not limited to using the recovered code and/or pulse for any particular purpose.

Also, as mentioned, it should be understood that the acts of method 200 may be performed on multiple signals simultaneously. For example, as mentioned, the transmitted signal may undergo multiple reflections, so that act 214 may involve receiving multiple signals, and act 216 may involve processing the multiple signals to recover pulses from each of the received signals. Alternatively, multiple signals may be transmitted by multiple transmitters, as will be described in greater detail with regard to FIGS. 9A-9D, and the receiving process may be performed on all of the signals from the various transmitters.

FIG. 3 illustrates one exemplary method of generating a code for modulating a transmitter signal, as shown at 206 in FIG. 2. The code may represent a pulse while not taking the form of a pulse, and according to some embodiments represents a randomized version of a pulse. As described earlier, it may be desirable in some contexts to send a pulse from a transmitter, since the distance to an object can be determined by measuring the time-of-flight of the pulse. However, there are drawbacks associated with conventional systems and methods of sending a pulse. Conventional systems are often complex and/or costly as the hardware needed to generate a pulse, and the large amplitude variations associated therewith, can itself be complex and/or costly. By contrast, systems for generating continuous wave transmission signals may be simpler, less costly, and less subject to failure. Thus, according to an aspect of the invention, the code used to modulate the continuous wave carrier signal may not actually take the form of a pulse, but rather may carry the information of a pulse in a non-pulse form. Thus, modulating a continuous wave carrier signal with the code may not alter, or not significantly alter, the continuous wave nature of the carrier signal.

Figure 4A:
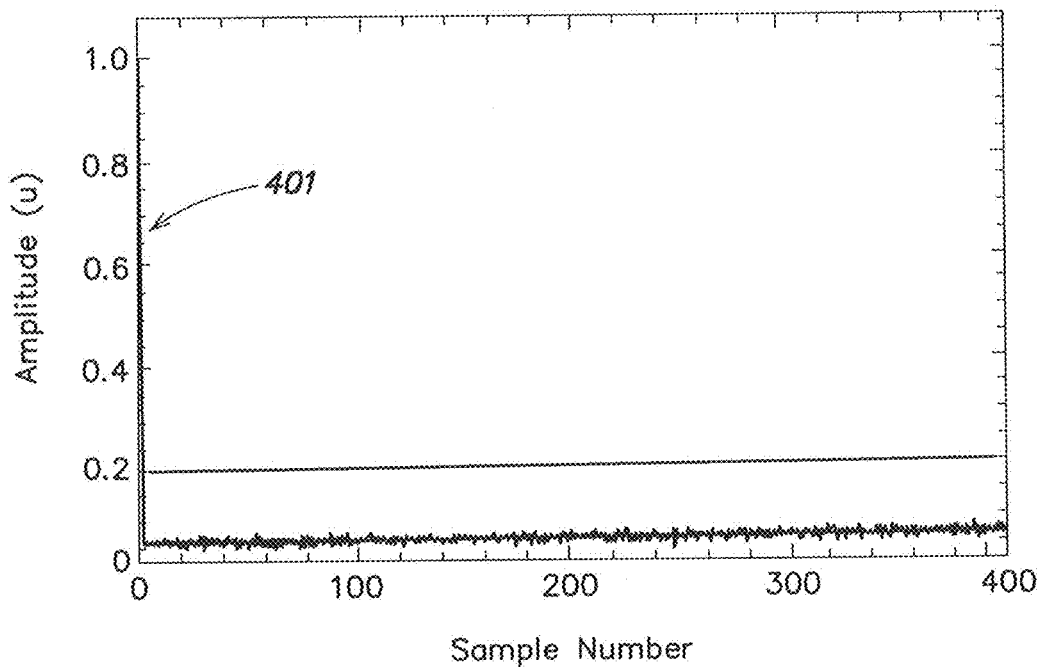
FIGS. 4A and 4B illustrate one non-limiting example of an impulse, and a time domain code which may be used in the methodology illustrated in FIG. 3.

Referring again to FIG. 3, act 206 from FIG. 2 of generating a code representing a pulse may therefore comprise, at 302, defining a pulse by its Fourier components. Any type of pulse may be used for such purposes, and therefore the pulse defined at 302 may be a square pulse, a triangle pulse, an impulse, or any other type of pulse. The characteristics of the pulse, such as duration, shape, and amplitude, may be chosen as desired for a particular system and application, as the various aspects of the invention are not limited to utilizing any particular types of pulses. For ease of explanation, and without limiting the scope of any of the aspects described herein, an impulse (i.e., a delta function) will be described as an exemplary pulse. FIG. 4A illustrates an impulse 401, having substantially zero width, which has been normalized to have an amplitude of approximately one in terms of generic units u (e.g., voltage in Volts), and which may be used for purposes of explanation with regard to FIG. 3. It should be appreciated that such normalization is optional, and that the various aspects of the invention are not limited to the use of normalized pulses. Furthermore, it should be appreciated that FIG. 3, and the other methods described herein, are not limited to use with impulses.

The act 302 of defining the impulse by its Fourier components may be done using integrals, or in practice may be done using a summation, as the various aspects of the invention are not limited in this respect. For purposes of explanation, the pulse may be resolved over a time, or duration, T. The pulse may be defined by a finite number of sample points over the duration T, corresponding to the Fourier components of the pulse. Any number of sample points may be used. In some embodiments the method of FIGS. 2-3 may be implemented using a system comprising an analog-to-digital converter (A/D converter, also referred to as an ADC) and/or a digital-to-analog converter (D/A converter, also referred to as a DAC), as will be described below in reference to FIG. 7. In such situations, the number of sample points, $N_s$, over which the pulse is resolved may be given by $N_s = F_s T$, where $F_s$ is a sample rate, for example corresponding to the sample rate of an A/D converter or D/A converter.

After defining the impulse by its Fourier components, at 302, the act 206 of producing a code may further comprise, at 304, generating multiple random phases to be added to the Fourier components of the impulse from 302. The random phases may be generated by a random number generator, by hand, or in any other suitable manner, as the various aspects of the invention are not limited in this respect. According to one embodiment, a random phase vector $\phi_n$ includes $N_s/2$ phases (for a real signal), to be randomly distributed among the $N_s$ Fourier components defining the pulse from 302.

According to the non-limiting example of FIG. 3, the generated random phases are then added to the Fourier components of the impulse. One phase may be added to each of the Fourier components. At 308, an inverse fast Fourier transform (IFFT) is then performed on the Fourier components randomized with the random phases, thus producing a time domain signal. Equation 2 shows an example of the resulting time domain signal, which, as will be described in greater detail below, may correspond to the signal sent from a computing engine to a D/A converter:

$$s(t_m) = \sum_{n=-N_s/2}^{N_s/2-1} \exp\left[-i\left(n\frac{2\pi}{N_s}m + \phi_n\right)\right] \quad \text{Eq. (2)}$$

where $\phi_n = \phi_{-n}^*$ and $t_m = m\tau_s$ wherein $\phi_n$ is the random phase vector, m is the sample point number, $\tau_s$ is the sample time, and $t_m$ is the signal at the $m^{th}$ point in time.

The signal of Eq. (2) has a low "peak-to-average" ratio. In particular, because the phases of the Fourier components are randomized prior to taking the IFFT, the energy of the pulse may be distributed substantially evenly across the duration of the code, and the ratio of peak energy to average energy may be less than approximately ten, or smaller. In some embodiments, then, a signal generator (e.g., a laser, a radio wave generator, etc.) may be nominally operated with a low peak-to-average ratio (e.g., a peak-to-average power less than 10). In addition, the signal of Eq. (2) is periodic with interval T. For a perfectly random phase, the output amplitude is Gaussian, distributed with a root-mean-square (rms) amplitude of 1. In some embodiments, a DC term (of amplitude between 1-4, or any other suitable amplitude) may be added to the signal of Eq. (2) prior to modulating the carrier signal with the signal of Eq. (2), to avoid substantial clipping. However, the method of FIG. 3 is not limited in this respect.

It should also be appreciated that Eq. (2) is one non-limiting example of a suitable code that may be generated according to the methodology of FIG. 3. Other forms of codes are also possible. For example, an alternative suitable code may be given by:

$$s(t_m) = \sum_{n=-N_s/2}^{N_s/2-1} A_n(N_s)\exp\left[-i\left(n\frac{2\pi}{N_s}m + \phi_n\right)\right] \quad \text{Eq. (3)}$$

where $$A_n(N_s) = \exp\left(\frac{-1}{2}\frac{n^2}{N_s^2}\right) \quad \text{Eq. (4)}$$

and wherein the phase vector is defined by:

$$\phi_n(c, p) = c\left(\frac{n}{\pi}\right)^p \sin(n) \quad \text{Eq. (5)}$$

For particular values of c and p in Eq. (5), a Gaussian noise-like output is created. Thus, the pair (c,p) may be chosen from a large set of possible choices and still provide a unique code to a transmit-receive pair, even though the phase vector is not randomized.

Figure 4B:
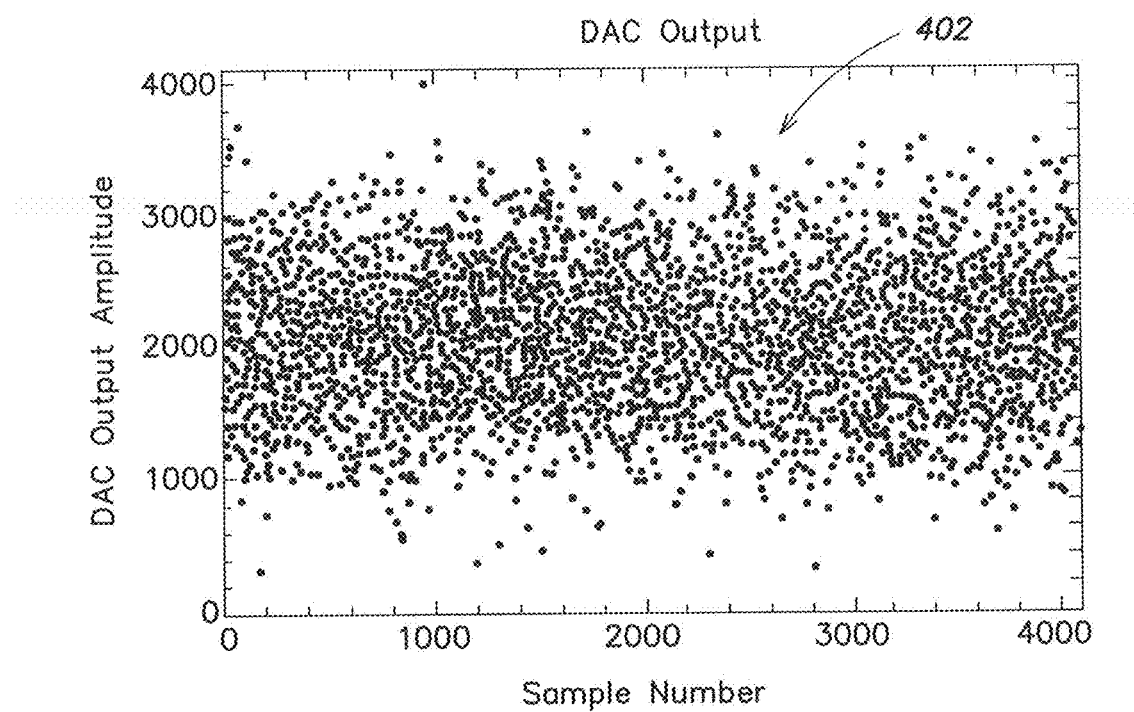

FIG. 4B illustrates a time domain code 402 which may be generated by applying the methodology of FIG. 3 to the impulse 401 of FIG. 4A, and which may be used to modulate a continuous wave carrier signal. The y-axis of FIG. 4B is given in terms of the output state of a 12-bit digital-to-analog (D/A) converter (alternatively referred to as a "DAC"), which is one example of a component which may used in producing the code. Thus, the actual units of the y-axis may correspond to any suitable voltage.

Various characteristics of the code 402 shown in FIG. 4B may be mentioned. For example, it should be appreciated that the codes described herein need not be produced using a D/A converter. Also, it should be appreciated that the code shown in FIG. 4B includes a DC offset of approximately 2000, i.e., has been scaled, to prevent clipping of the signal. Such scaling is optional, and need not be done in every instance. In addition, the code in FIG. 4B contains 4096 sample points, although the methods described herein are not limited to using codes of this length. FIG. 4B illustrates how, in some embodiments, the generated code may appear similar to noise.

Figure 4C:
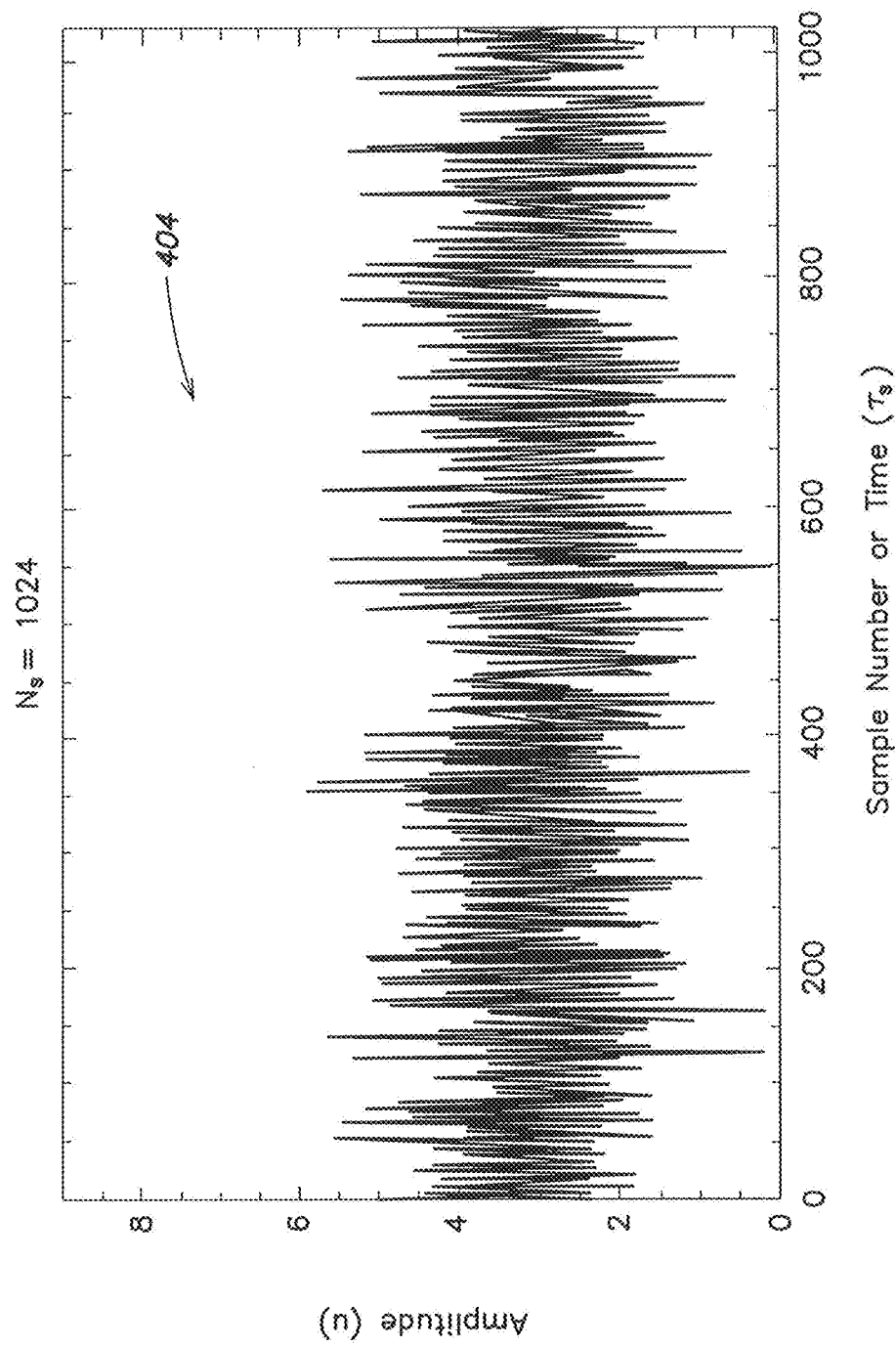
FIG. 4C illustrates an exemplary transmitter signal formed with a code of the type illustrated in FIG. 4B.

FIG. 4C illustrates an example of a transmitter signal 404, for example output by a laser, that includes a continuous wave carrier signal modulated with a code, such as the code illustrated in FIG. 4B. The amplitude of the signal is given in generic units (u), e.g., a voltage in milliVolts, Volts, or any other suitable amplitude, since it will be appreciated that the absolute magnitude of the signal may depend on various components of a system generating such a signal, so that the various aspects of the invention are not limited to working with any particular magnitudes of signals. The signal may be periodic with a period T, for example. It should be appreciated by reference to FIG. 4C that a transmitter signal according to various aspects of the invention does not contain a pulse in form, even though it may contain the information of a pulse.

Figure 5:
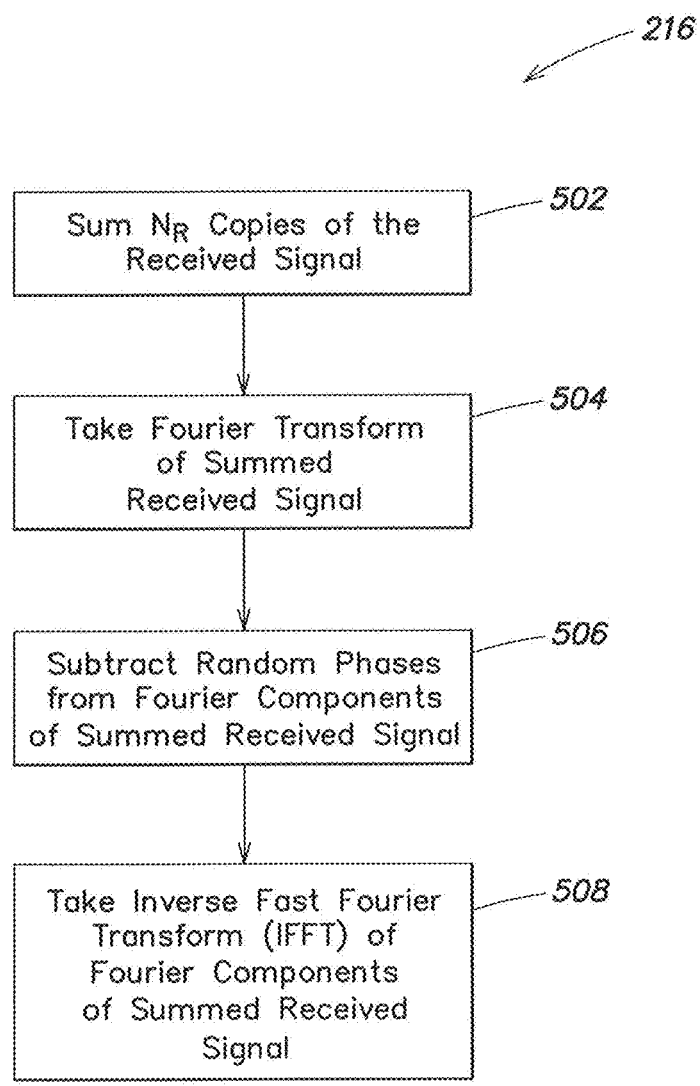
FIG. 5 is a flowchart of an example of a method of processing a signal to recover a pulse, as used in the method of FIG. 2.

FIG. 5 illustrates one non-limiting embodiment of the act 216 in FIG. 2 for processing a coded transmitter signal reflected from an object. According to some embodiments, the signal received from the target, i.e., the reflected signal, is periodic with an interval T. For example, as mentioned, FIG. 4C illustrates an example of an output from a signal generator according to one embodiment, which may be periodic. The signal received from the target may be substantially the same in form, with some possible attenuation of the amplitude. As shown in FIG. 5, act 216 may optionally begin at 502 by summing some number, $N_r$, of copies of the received signal. For example, the samples $N_s$ for each interval T of the received signal may be stored and added to the samples from the next interval of the received signal. Thus, the periodic signal may add coherently, while noise in the signal may add incoherently. The noise in the signal may arise from the environment, from circuit components (e.g., a photodetector, a transimpedance amplifier, or other circuitry of a receiving system), or from other sources.

As mentioned, the summation performed at 502 in FIG. 5 is optional, and need not be performed in all situations. The summation may improve the signal-to-noise ratio (SNR) of the received signal by an amount equal to the square root of the number of additions performed. Thus, the more additions performed, the better the improvement of the signal.

Subsequently, at 504, a Fourier transform may be performed on the received signal, or in the non-limiting embodiment of FIG. 5, on the summed received signal formed at 502. The resulting Fourier components may each include a phase, such as a random phase, corresponding to the phases added at act 306 in FIG. 3 when generating the code.

Therefore, the methodology illustrated in FIG. 5 may proceed at 506 by removing the random phases from the Fourier components of the summed received signal from 504. This may be accomplished by subtracting the random phases from the Fourier components of the summed received signal, or by multiplying each of the Fourier components by the complex conjugate of the random phase term $\exp[-i\phi_n]$ of Eq. (2). According to this non-limiting embodiment, the random phase subtracted from each of the Fourier components at 506 corresponds to the random phase added to each of the corresponding Fourier components at 306 in FIG. 3, such that the result of 506 is to produce Fourier components that do not have any random phase value. For example, the phase vector $\phi_n$ used to randomize the transmitted signal at 306 in FIG. 3 is subtracted from the Fourier transformed signal from act 504.

Subsequently, at 508, an IFFT of the Fourier components produced at 506 may be performed to recover the pulse defined at 302 in FIG. 3. The IFFT results in a time domain signal, as shown in Eq. (6):

$$S_{rec}(t_m) = \qquad \text{Eq. (6)}$$

-continued
$$\left(\frac{\eta'}{z^2}\sqrt{\frac{1}{RT}}\right)\sum_{n=-N_s/2}^{N_s/2-1}\exp\left[-i\left(n\frac{2\pi}{N_s}\left(m+\frac{2z}{c}\right)+\phi_n\right)\right]\exp[+i\phi_n]$$

in which R is the update rate (e.g. the rate at which the transmitted signal is transmitted), T is the total code duration, or length, RT is the number of additions performed at act 502, m is the sample point number, z is the distance from the transmitter/receiver to the reflecting object, c is the speed of propagation of the transmitted and reflected signals, and $\eta'$ is an attenuation coefficient. The term $$\left(\frac{\eta'}{z^2}\sqrt{\frac{1}{RT}}\right)$$

is the result of attenuation of the signal from a distant target and averaging of the received signal. The term $2z/c$ corresponds to the delay to the target, with z being the distance to the target (or object), and c being the speed of propagation. The last term, $\exp[+i\phi_n]$, is the operation of multiplication by the original "randomized" phase vector after taking the FFT of the received signal. The resultant signal $S_{rec}(t_m)$ is a "delta function" at a delay corresponding to $2z/c$ or at an array location $$m_z = \frac{2z}{c\tau_s},$$

where $m_z$ is the sample point number, and $\tau_s$ is the sample time.

Figure 6A:
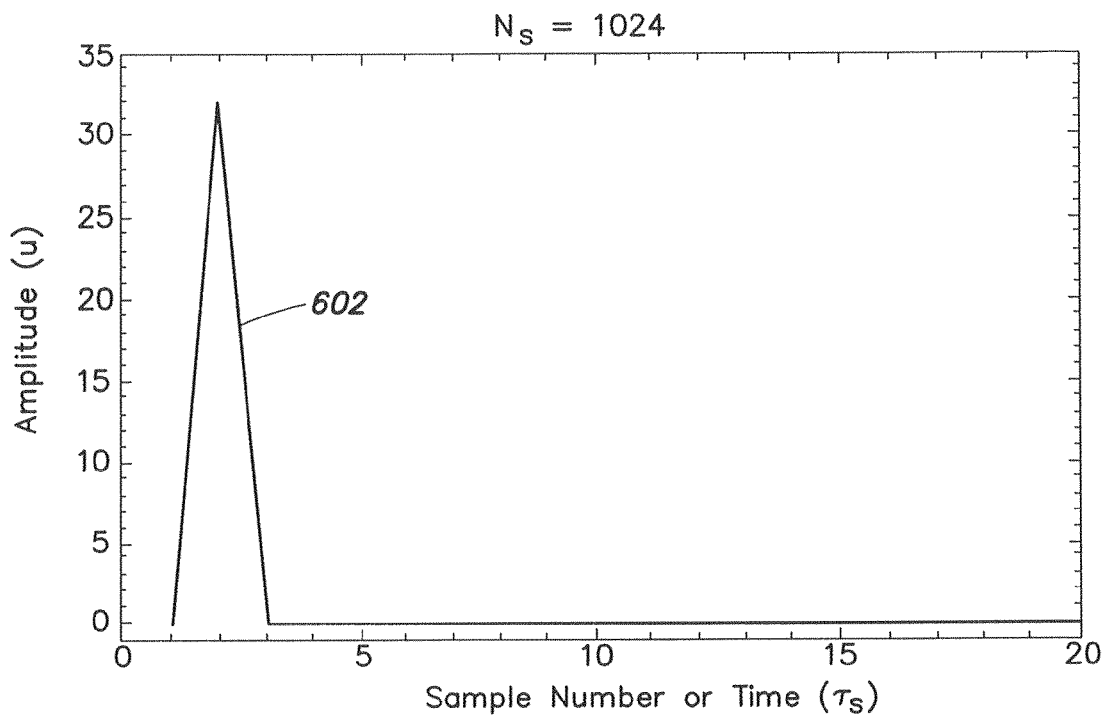
FIGS. 6A and 6B illustrates examples of pulses reconstructed from a reflected transmitter signal using the method of FIG. 5.
Figure 6B:
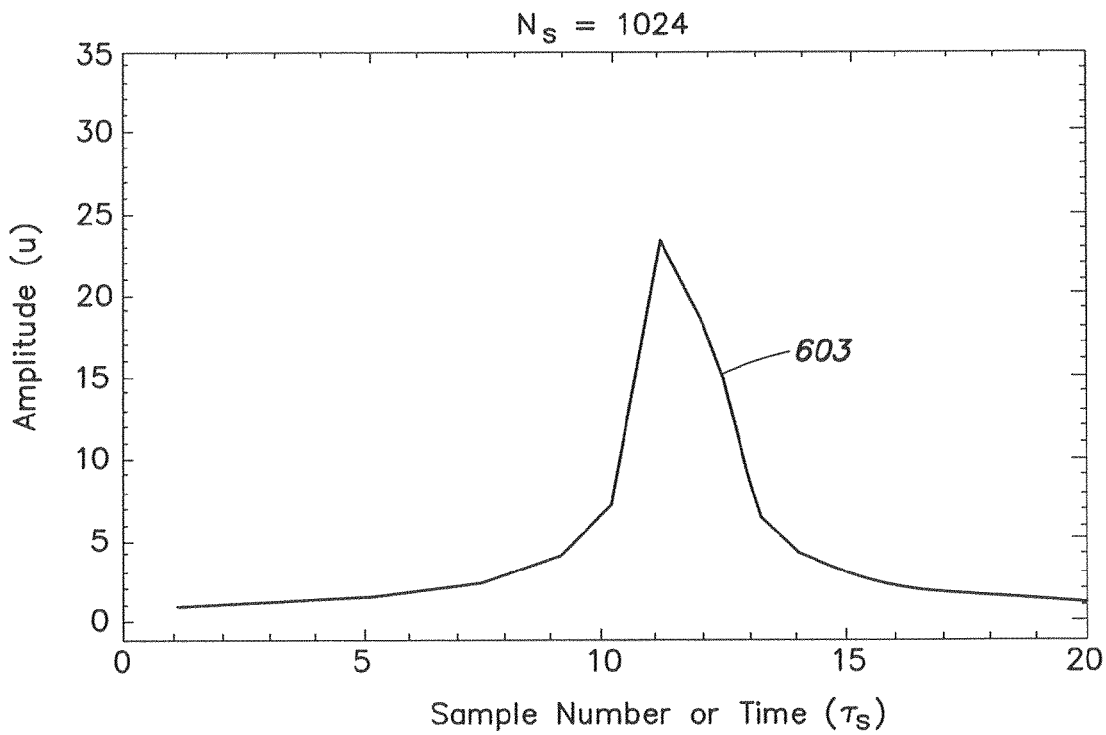

FIG. 6A illustrates an example of a resulting reconstructed pulse 602 produced by applying the methodology of FIG. 5 on a signal such as that shown in FIG. 4C, which is approximately a delta function. The units of amplitude are generic units (u), given that the absolute magnitude of the amplitude (i.e., the voltage) may differ depending on the type of system used to implement the method. FIG. 6B, which also shows an amplitude in generic units (u), illustrates another example of a reconstructed pulse 603 attained by processing a signal such as that shown in FIG. 4C using the methodology of FIG. 5, using the assumption that the transmitted signal is reflected from an object located 50 meters from the transmitter/receiver. As will be described in connection with FIG. 7, the receiver may include circuitry having a finite sampling rate, such as an A/D converter. The reconstruction of FIG. 6B assumes a sampling rate of 125 MHz. As shown, the recovered signal is not exactly an impulse, but rather is spread across multiple samples, or bins, with the peak falling between the $10^{th}$ and $11^{th}$ bins. The samples, or bins, correspond to the sampling rate of an A/D converter, such as A/D converter 724 in FIG. 7. As will be described in connection with FIG. 8, below, one aspect of the invention provides a method of determining the placement of the reconstructed pulse within the bins.

Several features of the methodology of FIGS. 2, 3, and 5 should be mentioned, as well as features of the resulting signals. For example, it should be appreciated that the phase vector $\phi_n$ is unique to a transmit-receive pair, and therefore may be used as a "key" to key a transmitter and receiver to each other, thus enabling them to operate accurately in the presence of other transmitters and receivers. Operating on the received signal with different phases $\phi_n$ than those used to generate the transmitter signal will not result in the reconstructed delta function. In this manner, the phase $\phi_n$ may operate as a "key," since the receiver may not recover the pulse without having the correct phase values, i.e., the correct "key." Thus, the method shown in FIGS. 3 and 5 automatically provides a unique key for a transmitter-receiver pair. It should be appreciated that while the phases $\phi_n$ may be one type of key, that other types of keys may be used to operate on a pulse in generating the code, and then be used by a receiver in recovering the pulse from the transmitter signal. Thus, phase values $\phi_n$ are merely one non-limiting example of a key that can be used to generate a code by transforming a pulse into a non-pulse form.

In addition, it should be appreciated that the resultant "peak amplitude" of the delta function reconstructed according to the method of FIG. 5, for example the reconstructed delta function of FIG. 6A, may have an amplitude that differs from the amplitude of the transmitted signal, for example due to attenuation or other factors. As one non-limiting example, the reconstructed delta function may have an effective amplitude of $$\frac{\sqrt{N_s}}{3} P_a$$

where $P_a$ is the average power, and $N_s$ is the number of sample points of the code. The factor of one-third (i.e., ⅓) may be a practical consequence of implementing the methods described herein, for example in that the factor of one-third may correspond to the fact that a DC term may be added to the transmitter output signal (e.g., the signal of FIG. 4C includes a DC offset of approximately 3) to avoid clipping of the transmitter output. Thus, it should be appreciated that the factor of ⅓ is just one example, and that other values (e.g., ½, ¼, or other values) may result from other systems. The average power $P_a$ may be given by $P_a = (2\pi)^{(1/2)} P_o R$, where $P_o$ is the peak power and R is the update rate.

Furthermore, applying the methodology of FIG. 5 may result in a satisfactory SNR of the system. For example, the SNR may be given by Eq. (7):

$$SNR = \frac{\eta'}{z^2} \left( \frac{\sqrt{\frac{1}{TR}} \frac{\sqrt{N_s}}{3} P_a}{\sqrt{\frac{F_s}{2}}} \right) = \frac{\eta'}{z^2} \frac{P_a}{3} \sqrt{\left(\frac{2}{R}\right)} = \frac{\eta'}{z^2} \frac{P_a}{3} \sqrt{\left(\frac{2}{R}\right)} \quad \text{Eq. (7)}$$

Eq. (7) illustrates that the SNR is independent of the sample rate used throughout the transmitter signal generation and processing, but does depend on the update rate R. In addition, it should be appreciated that the SNR of Eq. (7) is similar to that achieved in amplitude modulated and frequency modulated continuous wave systems, even though the transmitted and received signals of FIGS. 2, 3, and 5 contain the information of a pulse.

In addition, it should be appreciated that the detection range of a system employing the methodologies of FIGS. 2, 3, and 5 may be good. For example, the detection range of such systems may be equal to, or greater than, that of frequency modulated or amplitude modulated continuous wave systems operating at the same average signal generator output power (e.g., the output power of a laser).

Figure 7:
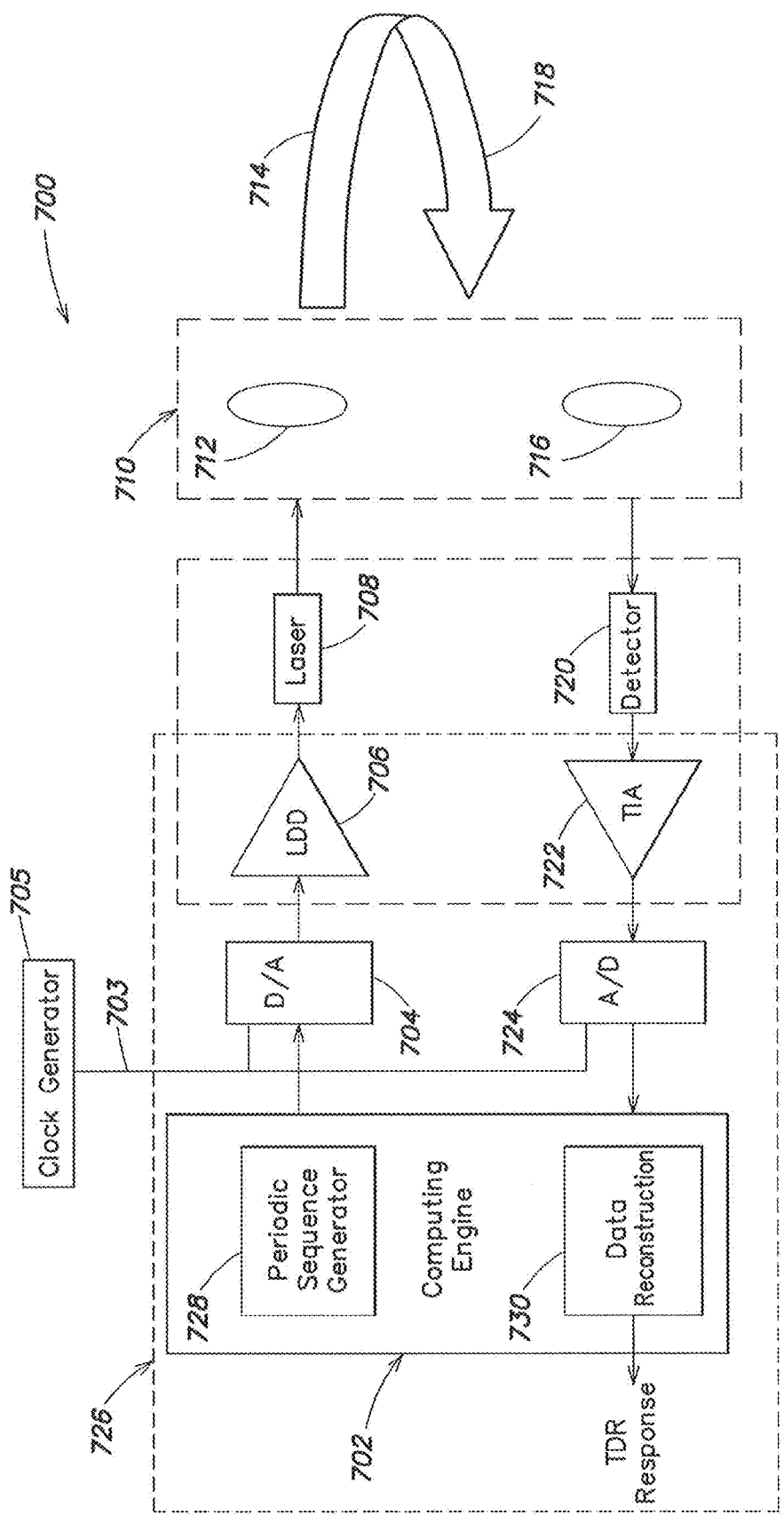
FIG. 7 is a transmitter/receiver system capable of operating according to the method of FIG. 2, according to one embodiment.
Figure 8:
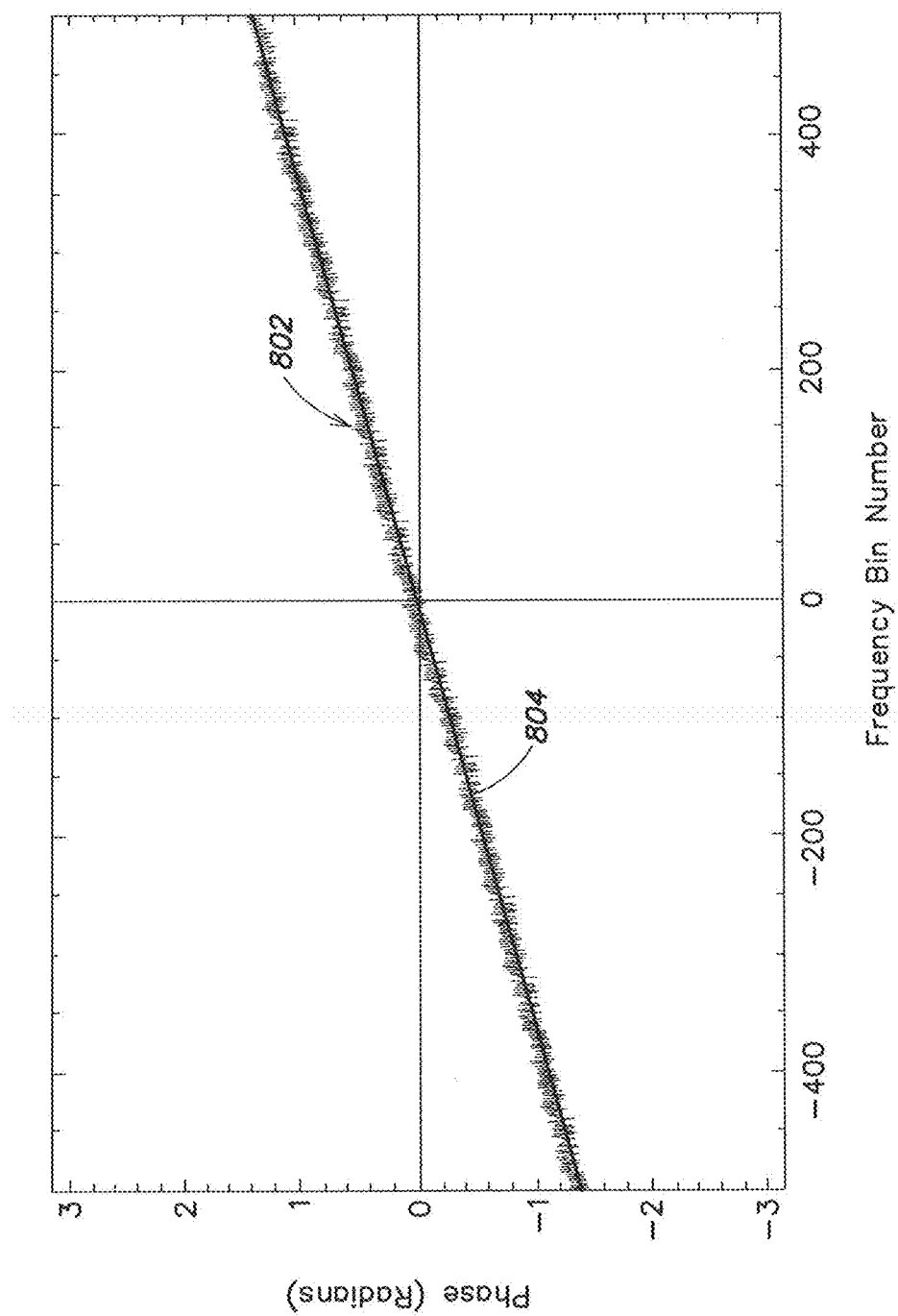
FIG. 8 is an example of a type of graph that can be used to facilitate determination of the timing of a received transmitter signal, according to one embodiment.

The methodologies illustrated thus far (e.g., the methods in FIGS. 2, 3, 5, and 12) may be employed by any suitable system. For example, FIG. 1 illustrates a system which may implement one or more of the methods described thus far. In addition, FIG. 7 illustrates a laser system, often referred to as a LIDAR system, which may implement one or more of the methods described thus far. The system 700 includes several components specific to the operation of lasers, such as a laser diode driver and the laser itself. However, it should be appreciated that analogous systems may have the same general configuration, yet operate in a different domain (e.g., RADAR), by switching certain components. Thus, the methodologies of FIGS. 2, 3, 5, and 12 are not limited to use in laser systems.

As shown, the system 700 comprises a computing engine 702, such as a digital signal processor (DSP). The computing engine 702 may perform various processing functions, such as performing one or more of the acts illustrated in FIGS. 2, 3, 5, and 12. For this reason, the computing engine 702 may include a periodic sequence generator 728 and a data reconstruction circuit 730. The periodic sequence generator may be used to generate a code for modulating a continuous wave transmitter signal, such as has been described herein. The periodic sequence generator may be configured to generate codes having lengths of between 512 and 4096 sample points, or having any other suitable number of sample points, as the various aspects of the invention are not limited in this respect.

The computing engine 702 is coupled to a digital-to-analog (D/A) converter 704, and in some embodiments the output of the periodic sequence generator 728 is coupled to an input of the D/A converter 704. Thus, the periodic sequence generator may provide a periodic sequence, such as a code, to the D/A converter 704, which may convert the digital code to an analog signal. The D/A converter 704 may be an 8-bit converter, or may have any bit value. According to the non-limiting example of FIG. 7, the D/A converter 704 is a clocked D/A converter that receives an input clock signal 703 having a frequency between approximately 50 MHz and 200 MHz from a clock generator 705. It should be appreciated that any clock generator and any clock frequency may be used, as the various aspects of the invention are not limited in this respect. In addition, the D/A converter 704 can have any suitable sampling rate, and in some embodiments the sampling rate may be varied to provide optimal SNR for a given processing power, maximum range, and distance resolution of the system.

According to the embodiment of FIG. 7, the output of the D/A converter 704 is connected to a laser diode driver (LDD) 706, which in turn is connected to a laser 708, to drive the laser. The LDD 706 and the laser 708 may be any suitable type of diode driver and laser combination, as the various aspects of the invention are not limited in this respect. For example, the LDD 706 may be a 100 MHz LDD operating on approximately 40-100 mA of current. Other LDDs may be used as well. The D/A converter 704 may provide an analog version of a code to the LDD 706, which may modulate the output of the laser 708 with the code. According to some embodiments, the D/A converter may be directly coupled to the laser, such that there is no LDD. Also, according to some embodiments, the laser may be replaced with a light emitting diode, or other type of signal source The system 700 further comprises projection and receiver optics 710. The projection and receiver optics may be configured to facilitate transmission and reception of signals, and therefore may have any suitable components for doing so. For example, the projection and receiver optics 710 may comprise a lens 712 for facilitating transmission of a transmitter signal 714. The transmitter signal 714 may be a coded continuous wave transmitter signal, having a code representing a randomized version of a pulse modulating a continuous wave carrier signal. While a single lens 712 is shown, it should be appreciated that the projection and receiver optics 710 may comprise multiple lenses, filters, or any other types of optics to facilitate transmission of the transmitter signal 714.

The projection and receiver optics 710 may further comprise a lens 716, or any other suitable optics (e.g., additional lenses, filters, or other forms of optics) for receiving a reflected signal 718. The reflected signal 718 may correspond to the transmitter signal 714 after being reflected off one or more objects.

It should be appreciated that while the projection and receiver optics 710 are illustrated as being within the same structure, as indicated by the dashed-line box, systems according to some aspects of the invention are not limited in this respect. For example, the projection optics (e.g., lens 712) and the receiver optics (e.g., lens 716) may be contained within distinct structures, may share one or more components, or may take any other suitable configuration.

The reflected signal 718 may be passed from the receiver optics, such as lens 716, to any suitable detector 720. The type of detector used for detector 720 may depend on the types of signals being received (e.g., LIDAR systems, RADAR systems, etc.) For example, the detector 720 may be a photodiode, an avalanche photodiode (APD), a photomultiplier tube, or any other suitable type of detector for the type of reflected signals 718 being detected. Also, the detector 720 may be integrated with one or more other components of the system 700, for example by being formed on a same chip as one or more of the other components.

The output signal produced by the detector 720 may be small in some embodiments. Therefore, it may be desirable to amplify the signal from the detector 720. Accordingly, in the system 700, the detector 720 is coupled to a transimpedance amplifier (TIA) 722. The TIA 722 may operate at 100 MHz, with very low noise, e.g., with root-mean-square (rms) noise of less than 2 pA/rtHz. However, other amplifiers with other operating characteristics may also be used. In addition, while a TIA is one example of an amplifier that may be used in system 700, it should be appreciated that alternative types of amplifiers may be used in other embodiments. In addition, in some embodiments no amplifier may be used. Furthermore, when an amplifier is used, the detector 720 may be integrated on a same chip as the amplifier.

The output signal from the TIA 722 is an analog signal in the non-limiting example of FIG. 7. To convert this signal to a digital signal, the output of the TIA 722 is coupled to an analog-to-digital (A/D) converter 724, which provides a digital signal to the data reconstruction circuit 730 of the computing engine 702 for further processing. The A/D converter 724 may be an 8 bit converter, a 12 bit converter, or may have any suitable bit value. As with D/A converter 704, the A/D converter 724 is a clocked converter in the non-limiting example of FIG. 7, and receives the clock signal 703 at one of its inputs. Thus, the D/A converter 704 and the A/D converter 724 may be synchronized. In this manner, the sampling performed by the D/A converter 704 may be synchronized with the sampling performed by the A/D converter 724, which may improve the accuracy of processing the reflected signal 718 to recover a code imbedded within the signal. In addition, as with the D/A converter 704, the A/D converter 724 may have any suitable sampling rate, and in various embodiments the sampling rate may be varied to provide optimal SNR for a given processing power, maximum range, and distance resolution.

The data reconstruction circuit 730 of computing engine 702 may receive the digital signal from A/D converter 724 and process the signal to recover the pulse from the signal, for example from the code modulated on the output of the laser 708 to produce the transmitter signal 714. It should be appreciated that the data reconstruction circuit 730 may perform alternative, or additional functions as well, as the various aspects of the invention are not limited in this respect.

As mentioned, the system 700 is a laser system, and therefore includes certain components (e.g., LDD 706 and laser 708) specific to operating with lasers. However, the same system structure may be applied to different contexts for operating on different types of signals. For example, the system 700 may be modified to operate as a RADAR system, or to produce millimeter wave signals having an approximate frequency of between 30 GHz and 600 GHz, or to operate in other contexts, by switching appropriate components. For example, the laser 708 may alternatively be a radio wave generator, and the detector 720 may alternatively be an antenna, rather than a photodetector. If the transmitter produces millimeter wave signals having an approximate frequency of between 30 GHz and 600 GHz, the detector may be a detector capable of detecting such signals. Other variations are also possible.

The system of FIG. 7 offers various benefits in terms of simplicity. For example, the system illustrates a direct connection between the TIA 722 and the A/D converter 724. Furthermore, the system illustrates a direct connection between the A/D converter 724 and the computing engine 702. Thus, according to some embodiments, no mixer is needed either between the TIA and A/D converter or between the A/D converter and the computing engine. Furthermore, according to some embodiments the D/A converter 704 may be directly connected to the laser 708.

Furthermore, one or more of the components of system 700 may be formed on a single integrated circuit chip, or die. For example, the components within dashed box 726 may be implemented on a single chip. However, other variations are possible.

Also, it should be appreciated that the system 700 may provide shared access to certain data, or values. For example, as has been described, according to some embodiments methods for generating and processing transmitter signals involve transforming a pulse into a non-pulse form with a key, and then transforming a code of a received signal back into the pulse using the key. Thus, according to an embodiment, the transmitting portion and receiving portion of the system 700 may both have access to such a key (e.g., a plurality of phase values). For example, the key may be stored in a memory accessible by the computing engine 702, or may be accessible to the computing engine in any other suitable manner, as the various aspects of the invention are not limited in this respect. Alternatively, the key may be transmitted between the transmitting portion and the receiving portion of the system 700.

As mentioned previously in connection with FIG. 6B, signals reconstructed according to the methodology of FIG. 5 may have features, such as peaks, that fall between time intervals, or bins, of the processing system. In addition, as shown in FIG. 6B, reconstructed pulses may fall across multiple bins. It may be desirable to identify the specific bin in which a reconstructed pulse peak falls. According to an aspect of the invention, a method for determining which of the bins a received pulse falls into (e.g., see FIG. 6B) is provided. In addition, a method of determining the distance to an object with greater resolution than that offered by the sample rate of the DAC and ADC (e.g., the DAC and ADC of FIG. 7) is provided.

In general, the smallest temporal delay of the reconstructed signal (e.g., the reconstructed delta function of FIGS. 6A and 6B) that can be resolved is given by $1/F_S$, which means the smallest distance resolution $\Delta z$ is given by $\Delta z = c/(2F_S)$, where $F_s$ is the sampling rate for sampling the received signal. However, the actual delay $2z/c$ may be written as:

$$\frac{2z}{c} = Q\frac{2\Delta z}{c}t'$$  Eq. (8)

where Q is the bin number (i.e., a whole number, such as 2, 3, 5, or any other number), and $(\Delta z)/c$ corresponds to the time duration of a bin. Thus, the reference t' is the fraction of time the pulse is offset from a bin boundary. Thus, the peak of the reconstructed signal will occur in the bin number Q. The amount of t' can be determined as follows. First, the reconstructed signal, having a peak located at Q, is shifted, or translated, such that the peak is located at the origin. Such translation of the peak to the origin may be performed in various manners, such as by translating the peak in the Fourier domain, or by any other suitable manner, as the methodology is not limited to translating the peak in any particular manner. Then, the phase of the FFT of the shifted, reconstructed signal (e.g., the signal in FIG. 6B) may be plotted as a function of frequency, as shown by line 802 in FIG. 8. The units of the horizontal axis are the frequency bin number of the FFT transformed signal, which is equivalent to units of 1/T, where T is the duration of the sequence. The slope of the straight line fit 804 provides an estimate of t'. The quality of this estimate is proportional to the SNR, such that a higher SNR results in a better estimate of t', which in turn implies that a very small fraction of $\Delta z$ can be estimated. Thus, the distance to an object can be determined with greater accuracy than would be provided by the sampling rate alone.

The method described for determining the placement of a peak within a bin may also be applied in situations involving multiple reflections of the transmitted signal, for instance as a result of the transmitted signal reflecting from multiple targets. In such a situation, multiple peaks are present in the recovered signal. The position of each peak may be determined by zeroing all signals except in the vicinity of the peak-of-interest and then applying the methodology just described in connection with FIG. 8 to determine the location of that peak. The same method may be applied to each peak in turn to determine their locations.

The ability to estimate distance with greater accuracy than that allowed by the sampling rate alone provides various benefits. For example, the position and the velocity of objects, which may be determined by measuring changes in position, may be determined with higher precision than would be allowed without the method described above.

The systems and methods described herein may be used in various contexts. For example, the ability to determine distance to an object may be useful in automotive applications, aerospace applications, surgical applications, archeological applications, astronomical applications, as well as others. In addition, various characteristics of the systems and methods described herein may facilitate useful operating scenarios. For example, it should be appreciated that the methods of coding a carrier signal may be used to uniquely identify a transmitter. For example, a plurality of transmitters may each implement a method of coding a carrier wave signal with a code representative of a pulse. A receiver receiving the signals transmitted by the plurality of transmitters may identify which signal was transmitted by a given transmitter if the code of that transmitter is known. In this manner, transmitters and receivers may be uniquely paired, which may facilitate operation in environments in which there are multiple transmitters and/or receivers. According to an aspect of the invention, multiple transmitter signals may be multiplexed onto a single receiver.

The systems and methods described thus far may allow multiple transmitters to be multiplexed onto a single receiver. This is due to the fact that the sequence period, or duration, T, can be chosen to be much longer than the maximum delay $T_{max}=2z_{max}/c$ expected, where $z_{max}$ is the maximum expected distance to an object and c is the speed of propagation of the transmitted and reflected signals. Thus, multiple transmitters may each provide the same output signal (e.g., a signal coded with the code of Eq. (2)), but with a different delay. For example, the delay, $T_d$, may be given by $pT_d > T_{max}$, where p is the number of the transmitter (e.g., transmitter number two out of four), if $p_m T_d = T$, where $p_m$ corresponds to the total number of transmitters. Thus, Eq. (2) may be modified to account for this delay:

$$s_p(t_m) = \sum_{n=-N_s/2}^{N_s/2-1} \exp\left[-i\left(n\left(\frac{2\pi}{N_s}m + p\frac{T_d}{\tau_s}\right) + \phi_n\right)\right]$$  Eq. (9)

Figure 9A:
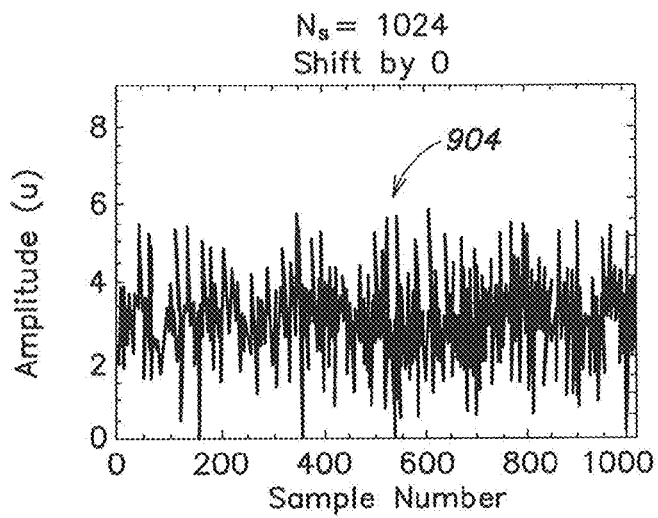
FIGS. 9A-9D illustrate examples of transmitter signals shifted relative to each other by a constant amount of delay, according to one embodiment.
Figure 9B:
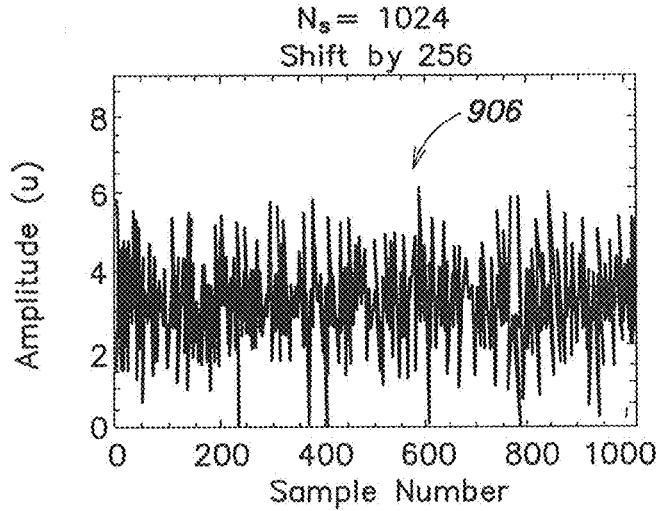
Figure 9C:
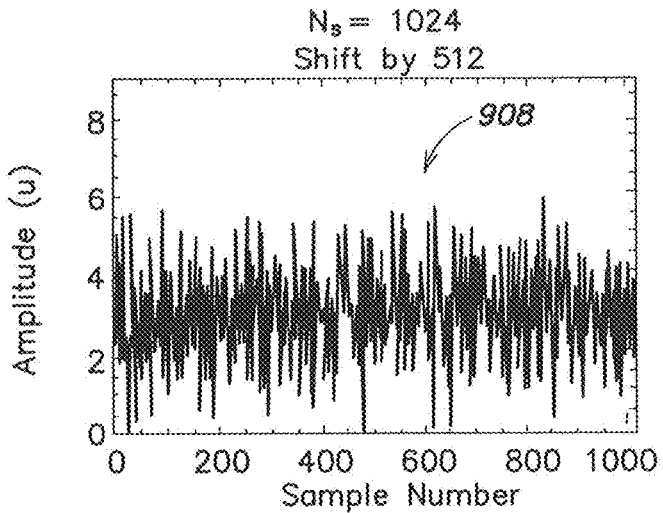
Figure 9D:
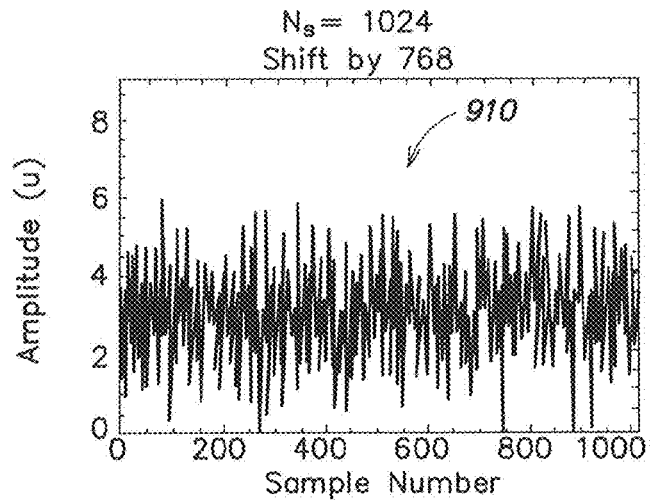

FIGS. 9A-9D show examples of the resulting signals 904, 906, 908, and 910 for four transmitters for which $N_S=1024$. The units of amplitude are generic units (u), which may be, for example, a voltage in milliVolts, Volts, or any other suitable metric. The units of the horizontal axes are the sample number. The signals are identical, except that they are shifted relative to each other. In particular, the signal 906 shown in FIG. 9B is delayed by 256 sample points from the signal 904 of FIG. 9A. Similarly, the signal 908 of FIG. 9C is delayed by 256 sample points relative to the signal 906 of FIG. 9B, and therefore by 512 sample points relative to the signal 904 of FIG. 9A. The signal 910 of FIG. 9D is delayed by 256 sample points relative to that of FIG. 9C, and therefore by 768 sample points relative to that of FIG. 9A. Again, each of the signals 9A-9D may be transmitted by the respective transmitters simultaneously.

For purposes of explaining how the multiplexing functionality may be achieved, it is presumed that the four transmitted signals shown in FIGS. 9A-9D are all reflected from an object. The reflected signals will be received by the single received in the interval:

$$pT_d < t < (p+1)T_d$$  Eq. (10)

Figure 9E:
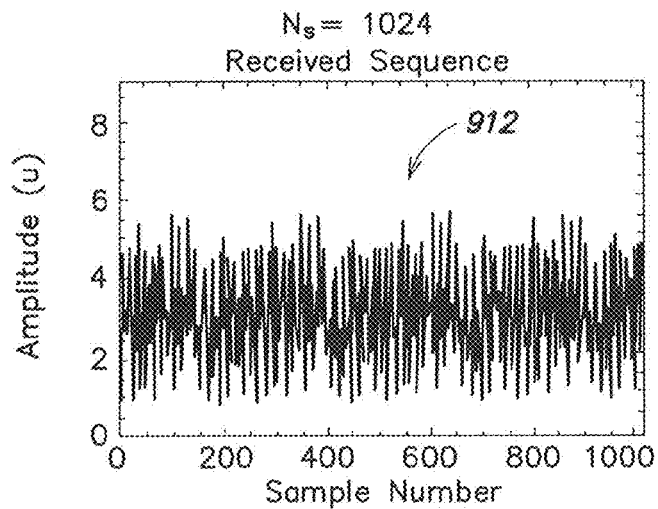
FIG. 9E illustrates a signal that can be received by a receiver, corresponding to the combination of the signals shown in FIGS. 9A-9D.

The received signal 912 will thus be a combination of the four reflected signals, as shown in FIG. 9E.

Figure 9F:
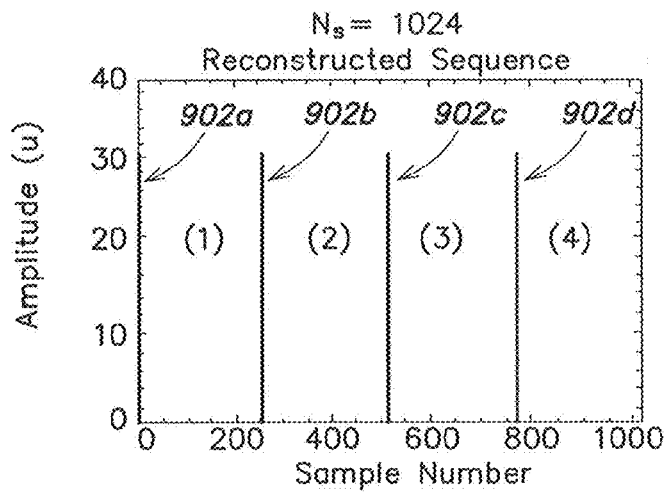
FIG. 9F illustrates pulses reconstructed from the signal of FIG. 9E.

FIGS. 9E and 9F illustrate that the received signal may be processed in accordance with the methods described herein (e.g., according to the methodology of FIG. 5) to recover the four transmitted signals, and the impulse modulated on each of the transmitted signals. The four impulses 902a, 902b, 902c, and 902d (impulse 902a is centered on the origin and is therefore aligned with the y-axis) are separated by 256 sample points from their respective neighboring impulse(s), corresponding to the delay between the transmitted signals. The regions labeled (1) thru (4) correspond to where the target reflections from each of the transmitters may appear, i.e., if the delay between the impulses varied slightly from the 256 sample points used as an example.

It should be appreciated that while FIGS. 9A-9F illustrate the multiplexing functionality with four signals, tens to hundreds of transmitters can be multiplexed on a single receiver. In general, the maximum number of multiplexed transmitters, $p_{max}$, may be given by:

$$p_{max} = \frac{\left(\frac{N_s}{F_s}\right)}{T_{max}} \qquad \text{Eq. (11)}$$

Thus, as an example, according to one embodiment a multi-transmitter system with a single receiver operates with an update rate R=10 Hz, a sample rate $F_s$=125 MHz, and a maximum range of 100 m, which corresponds to maximum delay of 667 nanoseconds. Assuming a period length of the transmitted sequence of T=$N_s/F_s$=64536/125 MHz 525 µs, almost 1000 transmitters may be multiplexed on a single receiver.

As mentioned, various operating scenarios may be realized by implementing one or more of the methods and/or systems described herein. FIGS. 10A-10C illustrate three such examples. However, it should be appreciated that other operating scenarios are also possible.

FIG. 10A illustrates a scenario in which a single transmitter 1002 is coupled with an array of receivers 1004, of which eight are shown. According to this scenario, the transmitter 1002 transmits a signal 1003 which may be reflected by one or more objects 1006*a* and 1006*b*. Signal 1003 may be a coded continuous wave signal, such as any of those previously described herein. Each of the receivers 1004 may be capable of processing signals reflected from the objects 1006*a* and 1006*b* to recover the code. Thus, the distance from an individual receiver 1004 of the array of receivers to the reflecting object can be determined.

FIG. 10B illustrates an operating scenario in which eight transmitters 1010*a*-1010*h* are coupled with a single receiver 1012. The transmitters may each transmit a respective signal 1011*a* . . . 1010*h*. The signals 1011*a*-1011*h* may be coded transmitter signals such as any of those previously described herein. The signals 1011*a*-1011*h* may each be the same as each other, may be the same except for different delays as described in connection with FIGS. 9A-9F, or may be unique transmitter signals. The transmitter signals 1011*a*-1011*h* may be transmitted toward objects 1014A and 1014B, which may create one or more reflected signals. The receiver 1012 may multiplex a plurality of reflected signals from the objects 1014A and 1014B to recover the codes on the reflected signals, for example as described in connection with FIGS. 9A-9F. It should be appreciated that while eight transmitters 1010*a*-1010*h* are shown, the scenario illustrated in FIG. 10B is not limited to use with eight transmitters.

FIG. 10C illustrates a scenario in which a single transmitter 1020 is coupled with a single receiver 1022. The transmitter 1020 may transmit a scanning transmitter signal 1024, which may be used to scan a field of view in which one or more objects may be present. For example, the transmitter may emit a signal that is scanned across the field of view illustrated by the arrow in the figure. The receiver 1022 may receive any reflected signals from objects within the field of view, and may process the reflected signals to recover a code imbedded in the transmitter signal 1024.

It should be appreciated that the scenarios illustrated in FIGS. 10A-10C may implement any suitable transmitters and/or receivers. For example, the transmitters and receivers may be capable of transmitting and detecting, respectively, laser signals. Alternatively, the transmitters and receivers may be capable of transmitting and detecting, respectively, radio frequency (RF) signals. Such scenarios may also be used with other types of transmitter signals. In addition, it should be appreciated that the three non-limiting scenarios illustrated in FIGS. 10A-10C are merely examples, and that other operating scenarios implementing one or more of the methods and/or systems described herein are possible.

In addition, the methods and systems described herein may be used to detect multiple targets, or multiple reflections. For example, a single transmitter may transmit a signal which undergoes multiple reflections, thus generating multiple reflected signals. A single receiver may receive the reflected signals and process them in accordance with one or more of the methods described above to recover each reflected version of the transmitted signals.

It should be appreciated that various alterations may be made to the methods and systems described herein. For example, according to some embodiments, systems implementing an A/D converter and a D/A converter may have variable sampling rates. The sampling rates of the converters may be varied to achieve optimal signal-to-noise (SNR) for a given processing power of the system, maximum expected range of the system, and desired distance resolution. According to some embodiments, the systems and methods described herein may be applied to short-range detection systems, and may also be used in long-range detection systems. In addition, according to some embodiments, a coded transmitter signal may have a low ratio of peak power to average power, such as being less than approximately ten, or lower in some embodiments. Also, according to some embodiments, the system 700 may not comprise a driver between the D/A converter and the laser. Rather, the output of the D/A converter may be directly provided to the laser.

Figure 11A:
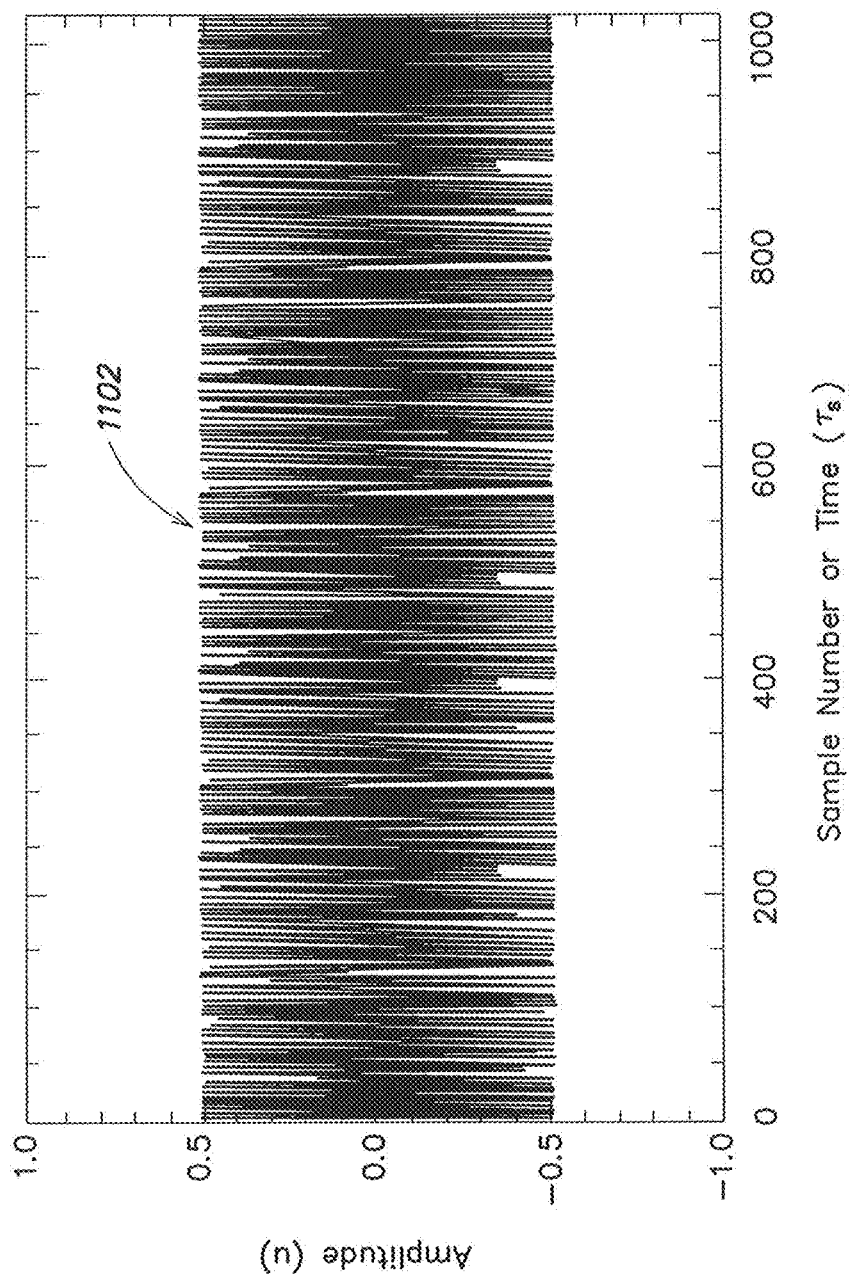
FIGS. 11A and 11B illustrate a received transmitter signal with clipping and a pulse reconstructed from the received transmitter signal, respectively, according to one embodiment.
Figure 11B:
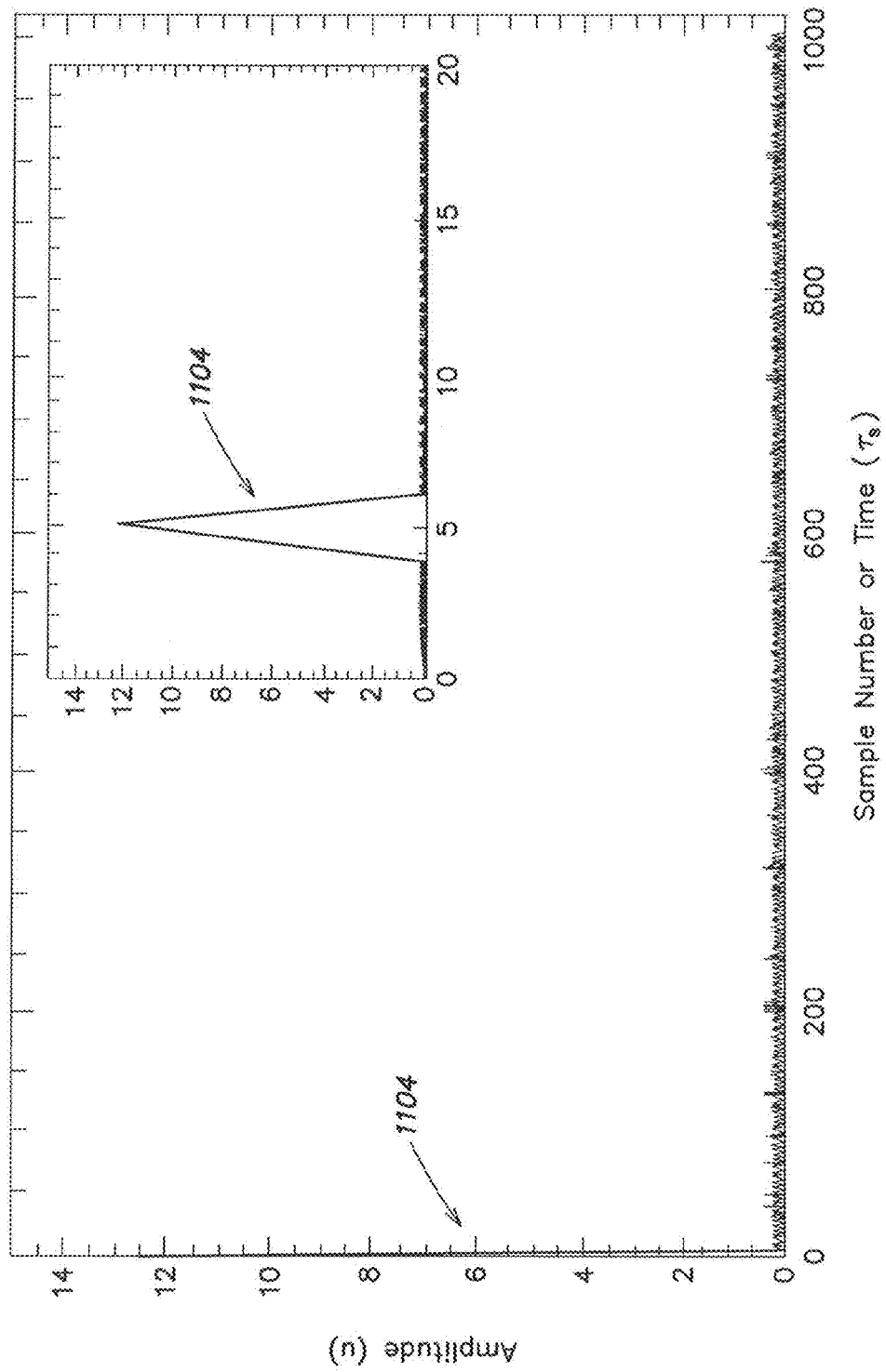

It should be appreciated that the methods described herein are robust. For example, FIGS. 11A-11B illustrate that the methods described herein may work even with transmitted signals that are clipped. In particular, FIG. 11A illustrates a coded transmitter signal 1102, which is coded with a randomized version of an impulse. The y-axis represents the amplitude of the signal, in generic units (u). The signal 1102 comprises a sequence having 1024 sample points. The signal is clipped. The clipping effectively adds noise to the reconstructed signal. FIG. 11B shows the reconstructed signal recovered using the methods described herein, with the inset showing a close-up view of the reconstructed impulse 1104. Thus, FIG. 11B shows that the transmitted impulse is accurately recovered despite the clipping of the transmitter signal.

Having described several embodiments of various aspects of the invention in detail, various modifications and improvements will readily occur to those skilled in the art. Such modifications and improvements are intended to be within the spirit and scope of the aspects of the various aspects of the invention. For example, several methods have been described as implementing a Fast Fourier Transform. It should be appreciated that other forms of Fourier Transform may be used, and that other types of transforms may be used. Accordingly, the foregoing description is by way of example only, and is not intended as limiting. The invention is limited only as defined by the following claims and the equivalents thereto.

What is claimed is:

1. A method of producing a coded continuous wave transmitter signal, the method comprising:
   producing a continuous wave carrier signal;
   producing a code to represent a pulse in non-pulse form, by defining the Fourier components of the pulse to produce a first plurality of sample points, adding phases to the first plurality of sample points to generate a second plurality of sample points, and performing an inverse Fourier transform on the second plurality of sample points; and modulating the voltage of the continuous wave carrier signal with the code to produce the coded continuous wave transmitter signal.

2. The method of claim 1, wherein the non-pulse form resembles noise.

3. A method of producing a coded continuous wave transmitter signal, the method comprising:
producing a continuous wave carrier signal; and
modulating the continuous wave carrier signal with a code to produce the coded continuous wave transmitter signal, the code representing a pulse in non-pulse form, wherein the code is a time-domain signal of the form:

$$s(t)=\text{IFT}[\text{FT}[h(t)]\exp[i\phi_n]],$$

wherein s(t) is the code as a function of time, h(t) is the pulse as a function of time, FT represents a Fourier transform, IFT represents an inverse Fourier transform, and $\phi_n$ represents a plurality of phase values.

4. The method of claim 3, wherein the plurality of phase values $\phi_n$ is a plurality of random phase values.

5. The method of claim 3, further comprising generating the code by defining the pulse by a plurality of Fourier components to create a frequency domain signal, as given by FT[h(t)], adding a phase value of the plurality of phase values to each of the plurality of Fourier components to create a modified frequency domain signal, and performing an inverse Fourier transform of the modified frequency domain signal.

6. The method of claim 5, wherein performing an inverse Fourier transform of the modified frequency domain signal produces a plurality of digital sample points, and wherein generating the code further comprises converting the plurality of digital sample points to analog sample points.

7. The method of claim 3, wherein the code has a finite duration, and wherein modulating the continuous wave carrier signal with the code comprises modulating the continuous wave carrier signal with multiple occurrences of the code.

8. The method of claim 3, wherein the code has a duration of between approximately 2 nanoseconds and approximately 200 microseconds.

9. The method of claim 3, wherein the continuous wave carrier signal has an approximately constant frequency.

10. The method of claim 3, wherein the coded continuous wave transmitter signal is a laser signal.

11. The method of claim 3, wherein the coded continuous wave transmitter signal is a radio frequency signal.

12. The method of claim 3, wherein the coded continuous wave transmitter signal is a millimeter wave signal having an approximate frequency of between 30 GHz and 600 GHz.

13. The method of claim 3, wherein the coded continuous wave transmitter signal has a ratio of peak power to average power of less than approximately ten.

14. A method, comprising:
electrically modulating a continuous wave carrier signal with a code representing a pulse in non-pulse form to produce a continuous wave transmitter signal, wherein the code is generated by transforming the pulse into the non-pulse form by defining the Fourier components of the pulse to produce a first plurality of sample points, adding phases to the first plurality of sample points to produce a second plurality of sample points, and performing inverse Fourier transform on the second plurality of sample points;
transmitting the continuous wave transmitter signal;
receiving the continuous wave transmitter signal; and
processing the continuous wave transmitter signal to recover the pulse.

15. The method of claim 14, wherein the code is generated by transforming the pulse into the non-pulse form using a key, and wherein processing the continuous wave transmitter signal to recover the pulse comprises using the key.

16. The method of claim 15, further comprising generating the code.

17. A method, comprising:
transmitting a continuous wave transmitter signal comprising a continuous wave carrier signal modulated with a code representing a pulse in non-pulse form;
receiving the continuous wave transmitter signal; and
processing the continuous wave transmitter signal to recover the pulse,
wherein the code is generated by transforming the pulse into the non-pulse form using a key, and wherein processing the continuous wave transmitter signal to recover the pulse comprises using the key,
wherein the key comprises a plurality of phase values.

18. The method of claim 17, wherein transforming the pulse into the non-pulse form comprises adding the phase values to the pulse, and wherein processing the continuous wave transmitter signal using the key comprises subtracting the phase values from the continuous wave transmitter signal.

19. A transmitting system, comprising:
a computing engine configured to generate a code, the code representing a pulse in non-pulse form, wherein the code is generated by defining the Fourier components of the pulse to produce a first plurality of sample points, adding phases to the first plurality of sample points to produce a second plurality of sample points, and performing an inverse Fourier transform on the second plurality of sample points; and
a signal generator configured to produce a signal in which the voltage is modulated by the code.

20. A transmitting system, comprising:
a computing engine configured to generate a code, the code representing a pulse in non-pulse form; and
a signal generator configured to produce a signal modulated by the code, wherein the code is a time-domain signal of the form:)

$$s(t)=\text{IFT}[\text{FT}[h(t)]\exp[i\phi_n]],$$

wherein s(t) is the code as a function of time, h(t) is the pulse as a function of time, FT represents a Fourier transform, IFT represents an inverse Fourier transform, and $\phi_n$ represents a plurality of phase values.

21. The transmitting system of claim 20, wherein the computing engine is a digital signal processor.

22. The transmitting system of claim 20, further comprising a clocked digital to analog converter having an input configured to receive a digital version of the code from the computing engine and an output configured to provide an analog version of the code.

23. The transmitting system of claim 22, further comprising optics coupled to the signal generator to facilitate transmission of the signal modulated by the code.

24. The transmitting system of claim 22, wherein the computing engine and the clocked digital to analog converter are integrated on a same chip.

25. The transmitting system of claim 22, wherein the output of the clocked digital to analog converter is directly coupled to an input of the signal generator.

26. The transmitting system of claim 22, wherein the clocked digital to analog converter has a variable sampling rate.

27. The transmitting system of claim 22, wherein the signal generator is a laser.

28. The transmitting system of claim 27, further comprising a laser diode driver having an input coupled to the output of the clocked digital to analog converter to receive the analog version of the code, and an output coupled to the laser to drive the laser.

29. The transmitting system of claim 20, further comprising optics coupled to the signal generator to facilitate transmission of the signal modulated by the code.

30. The transmitting system of claim 20, wherein the signal generator is a light emitting diode.

31. The transmitting system of claim 20, wherein the signal generator is a radio frequency signal generator.

32. A system, comprising:
a signal generator configured to produce a transmitter signal comprising a continuous wave carrier signal electrically modulated with a code representing a pulse in non-pulse form, wherein the code is generated by defining the Fourier components of the pulse to produce a first plurality of sample points, adding phases to the first plurality of sample points to produce a second plurality of sample points, and performing an inverse Fourier transform on the second plurality of sample points;
a transmitter configured to transmit the transmitter signal; and
a receiver configured to receive the transmitter signal and process the transmitter signal to recover the pulse.

33. A system, comprising:
a transmitter configured to transmit a transmitter signal comprising a continuous wave carrier signal modulated with a code representing a pulse in non-pulse form; and
a receiver configured to receive the transmitter signal and process the transmitter signal to recover the pulse, wherein the code is a time-domain signal of the form:

$s(t)=\text{IFT}[\text{FT}[h(t)]\exp[i\phi_n]]$, wherein s(t) is the code as a function of time, h(t) is the pulse as a function of time, FT represents a Fourier transform, IFT represents an inverse Fourier transform, and $\phi_n$ represents a plurality of phase values.

34. The system of claim 33, wherein the transmitter and the receiver are configured to have access to the plurality of phase values.

35. The system of claim 34, wherein the transmitter comprises a clocked digital to analog converter configured to receive a digital version of the code and produce an analog version of the code, and wherein the receiver comprises a clocked analog to digital converter configured to receive an analog input signal corresponding to the transmitter signal and provide a digital output signal, and wherein the clocked analog to digital converter is synchronized with the clocked digital to analog converter.

36. The system of claim 35, wherein the transmitter further comprises a first computing engine configured to produce the code and output the digital version of the code to the clocked digital to analog converter, and wherein the receiver further comprises a second computing engine configured to receive the digital output signal of the clocked analog to digital converter and process the digital output signal of the clocked analog to digital converter to recover the pulse.

37. The system of claim 36, wherein the first computing engine, the second computing engine, the clocked digital to analog converter, and the clocked analog to digital converter are formed on a same integrated circuit chip.

38. The system of claim 37, wherein the transmitter further comprises a signal generator driver coupled to the clocked digital to analog converter to receive the analog version of the code and drive a signal generator, and wherein the signal generator driver is formed on the integrated circuit chip.

39. The system of claim 38, wherein the receiver further comprises an amplifier configured to receive a signal from a detector and provide the analog input signal to the clocked analog to digital converter, and wherein the amplifier is formed on the integrated circuit chip.

* * * * *

UNITED STATES PATENT AND TRADEMARK OFFICE
CERTIFICATE OF CORRECTION

PATENT NO. : 8,462,834 B2  
APPLICATION NO. : 12/269615  
DATED : June 11, 2013  
INVENTOR(S) : Deliwala Page 1 of 1

It is certified that error appears in the above-identified patent and that said Letters Patent is hereby corrected as shown below:

In the Specification:

In column 9 at line 51 (approx.), Change "exp[-i $_n$]" to --exp[-i$\phi_n$]--.

In column 15 at lines 6-8 (approx.), Change "$\frac{2z}{c} = Q\frac{2\Delta z}{c}t'$" to -- $\frac{2z}{c} = Q\frac{2\Delta z}{c} + t'$ --.

In column 17 at line 12 (approx.), Change "MHz 525" to --MHz=525--.

In column 17 at line 34, Change "1010h." to --1011h.--.

In the Claims:

In column 19 at line 62, In Claim 14, change "inverse" to --an inverse--.

In column 20 at line 40, In Claim 20, change "form:)" to --form:--.

Signed and Sealed this  
Nineteenth Day of November, 2013

Teresa Stanek Rea  
*Deputy Director of the United States Patent and Trademark Office*